(12) United States Patent
Kawai et al.

(10) Patent No.: US 8,424,665 B2
(45) Date of Patent: Apr. 23, 2013

(54) CLUTCH UNIT

(75) Inventors: Masahiro Kawai, Iwata (JP); Hibi Yasumasa, Iwata (JP); Higashi Nobumasa, Fujisawa (JP)

(73) Assignees: NTN Corporation, Osaka (JP); Shiroki Corporation, Kanagawa (JP)

( * ) Notice: Subject to any disclaimer, the term of this patent is extended or adjusted under 35 U.S.C. 154(b) by 577 days.

(21) Appl. No.: 12/669,097

(22) PCT Filed: Jul. 16, 2008

(86) PCT No.: PCT/JP2008/062845
§ 371 (c)(1),
(2), (4) Date: Jan. 14, 2010

(87) PCT Pub. No.: WO2009/014046
PCT Pub. Date: Jan. 29, 2009

(65) Prior Publication Data
US 2010/0175962 A1    Jul. 15, 2010

(30) Foreign Application Priority Data

Jul. 24, 2007  (JP) ................................ 2007-192155
Jul. 24, 2007  (JP) ................................ 2007-192159

(51) Int. Cl.
*F16D 41/08* (2006.01)
*F16D 5/00* (2006.01)
*B60N 2/16* (2006.01)

(52) U.S. Cl.
USPC ................ 192/223.2; 192/15; 297/344.15

(58) Field of Classification Search ............ 192/15, 192/223.2, 19, 16; 297/372, 344.15, 344.12
See application file for complete search history.

(56) References Cited

U.S. PATENT DOCUMENTS

| 8,113,326 B2* | 2/2012 | Kawai ..................... 192/15 |
| 2004/0099498 A1* | 5/2004 | Kurita et al. ........... 192/12 B |
| 2011/0005881 A1* | 1/2011 | Kawai et al. ............ 192/45 |

FOREIGN PATENT DOCUMENTS

| EP | 1308643 A1 * | 5/2003 |
| JP | 2002-120610 | 4/2002 |
| JP | 2003-097605 | 4/2003 |
| JP | 2003-166555 | 6/2003 |
| JP | 2004-338426 | 12/2004 |

OTHER PUBLICATIONS

International Preliminary Report on Patentability and Written Opinion of the International Searching Authority mailed Feb. 18, 2010 in International (PCT) Application No. PCT/JP2008/062845.
International Search Report issued Oct. 28, 2008 in International (PCT) Application No. PCT/JP2008/062845.

* cited by examiner

*Primary Examiner* — Richard M. Lorence
*Assistant Examiner* — Lillian Nguyen
(74) *Attorney, Agent, or Firm* — Wenderoth, Lind & Ponack, L.L.P.

(57) ABSTRACT

A clutch unit includes a lever-side clutch portion for controlling transmission/interruption of rotational torque to an output side with lever operation, and a brake-side clutch portion for transmitting torque input from the lever-side clutch portion to the output side and for interrupting torque reverse-input from the output side. The lever-side clutch portion includes an input-side member to which torque is input with the lever operation and claw portions extending in an axial direction are provided on an outer periphery of the lever-side outer race of the input-side member. The brake-side clutch portion includes a stationary-side member restricted in rotation, and claw portions of the lever-side outer race are brought into slidable contact with an end surface of a brake-side outer race with rotation of the lever-side outer race, the rotation being effected with lever operation.

20 Claims, 27 Drawing Sheets

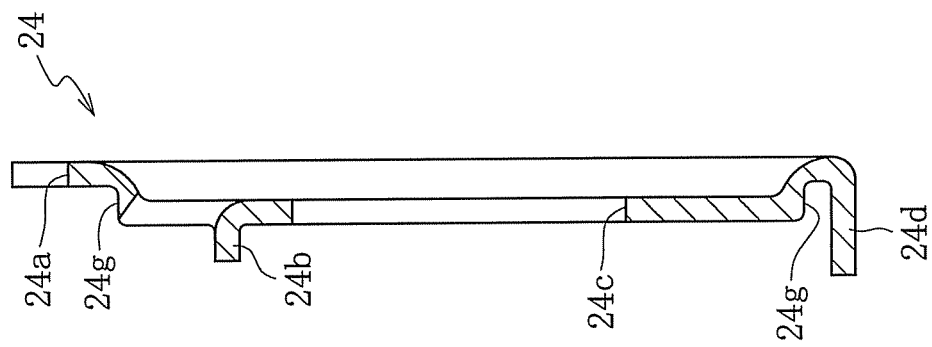
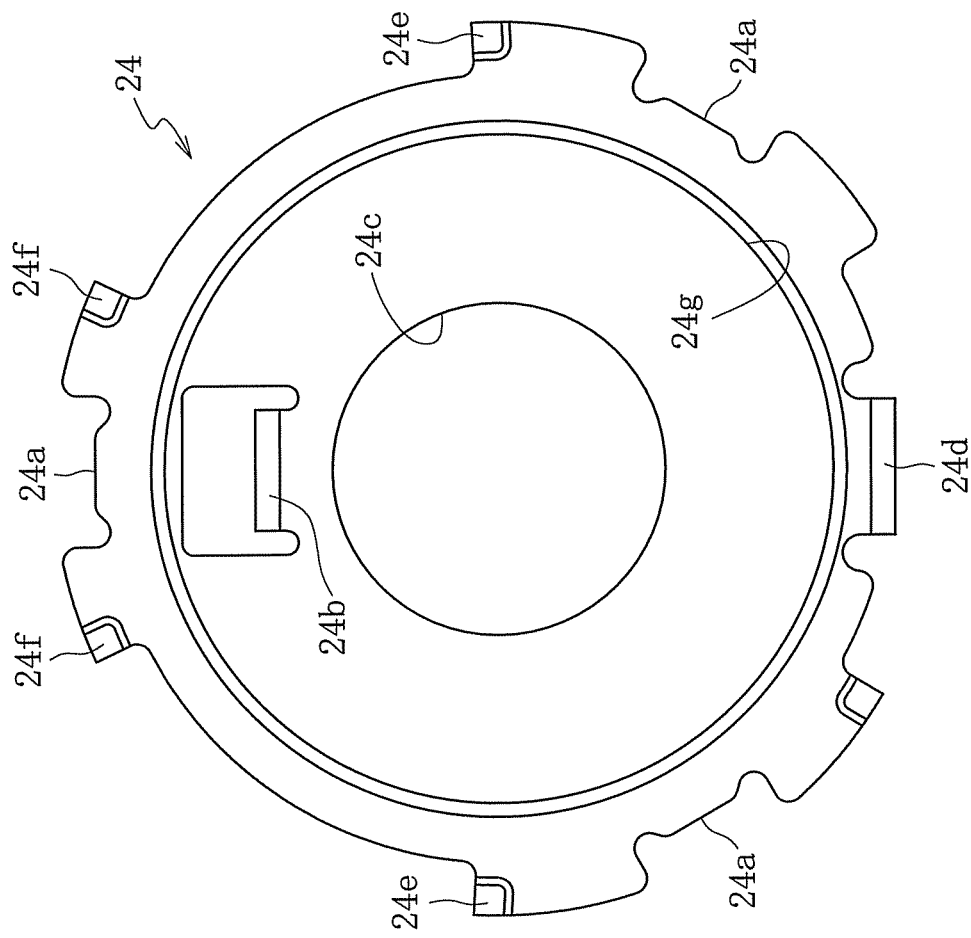

FIG. 15a
FIG. 15b
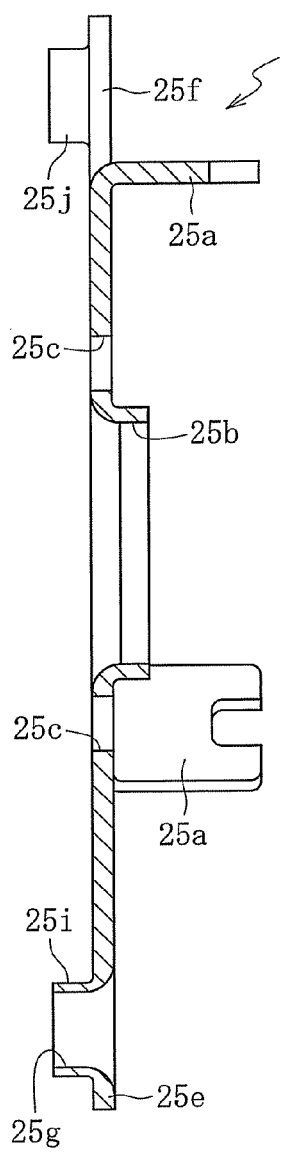
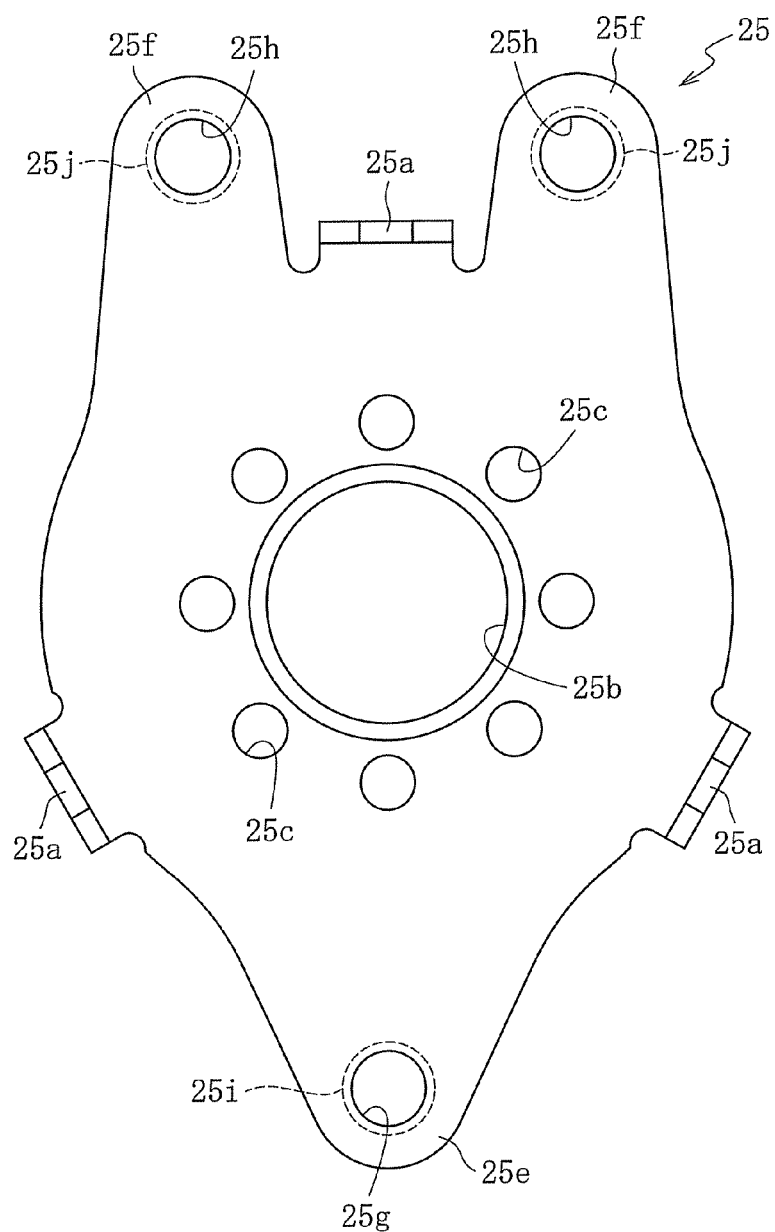

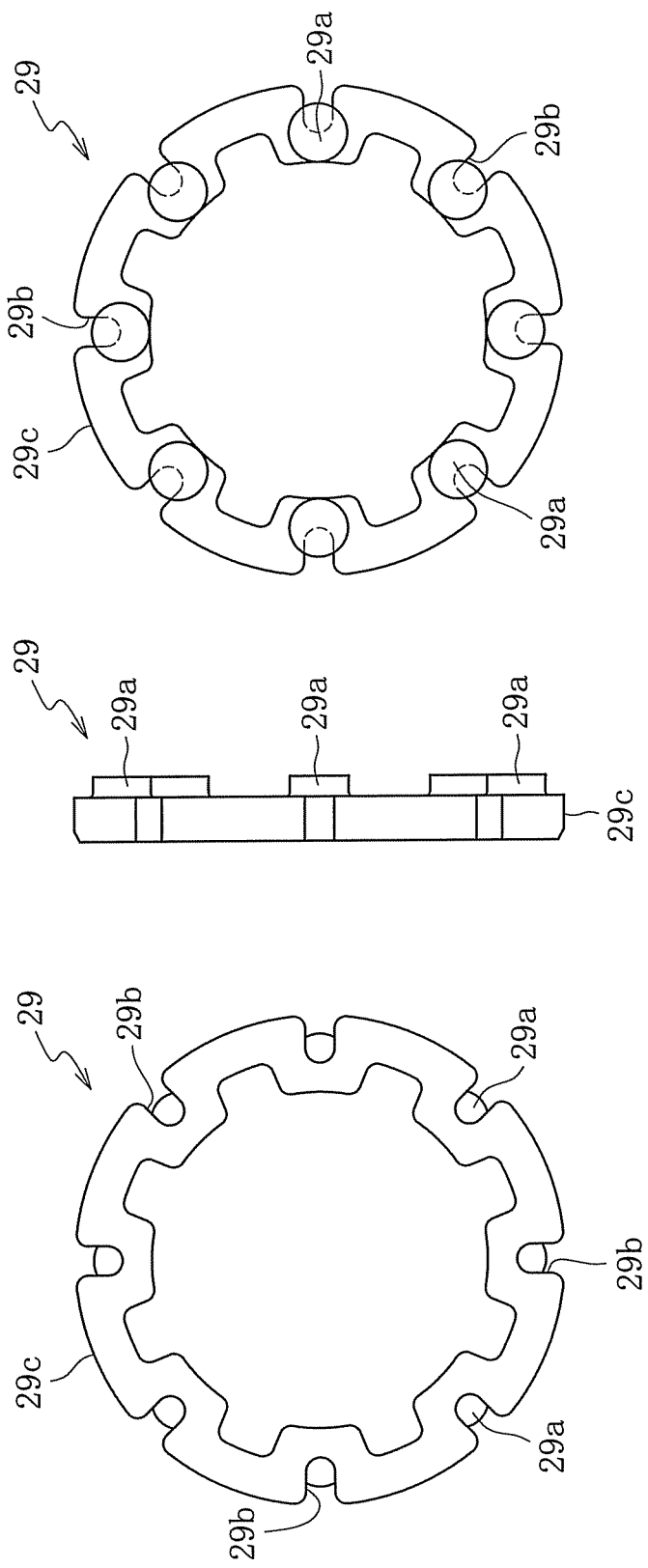

CLUTCH UNIT

TECHNICAL FIELD

The present invention relates to a clutch unit having a lever-side clutch portion transmitting rotational torque from an input side to an output side thereof and a brake-side clutch portion transmitting rotational torque from the input side to the output side and interrupting torque reverse-input from the output side.

BACKGROUND ART

Generally speaking, in a clutch unit using engagement elements such as cylindrical rollers or balls, a clutch portion is arranged between an input-side member and an output-side member, and, in the clutch portion, the engagement elements such as cylindrical rollers or balls are engaged/disengaged with respect to wedge gaps formed between the input-side member and the output-side member, thereby controlling transmission/interruption of the input torque.

A clutch unit of this type is incorporated into an automobile seat-lifter section for an which vertically moves a seat with lever operation. This clutch unit is provided with a lever-side clutch portion transmitting rotational torque from the input side to the output side and a brake-side clutch portion transmitting rotational torque from the input side to the output side and interrupting torque reverse-input from the output side (see, for example, Patent Documents 1 and 2).

FIG. 26 is a sectional view of an overall structure of the conventional clutch unit disclosed in Patent Documents 1 and 2, FIG. 27 is a sectional view taken along the line D-D of FIG. 26, and FIG. 28 is a sectional view taken along the line E-E of FIG. 26.

As illustrated in FIGS. 26 and 27, a lever-side clutch portion 111 mainly includes a lever-side outer race 114 serving as an input-side member to which torque is input with lever operation, an inner race 115 serving as a coupling member transmitting the torque from the lever-side outer race 114 to a brake-side clutch portion 112, a plurality of cylindrical rollers 116 serving as engagement elements controlling transmission/interruption of the torque input from the lever-side outer race 114 through engagement/disengagement between the lever-side outer race 114 and the inner race 115, a retainer 117 retaining the cylindrical rollers 116 at predetermined circumferential intervals, a brake-side outer race 123 serving as a stationary-side member restricted in rotation, an inner centering spring 118 serving as a first elastic member which is provided between the retainer 117 and the brake-side outer race 123 and accumulates elastic force with torque input from the lever-side outer race 114, restoring the retainer 117 to the neutral state with the accumulated elastic force through releasing the input torque, and an outer centering spring 119 serving as a second elastic member which is provided between the lever-side outer race 114 and the brake-side outer race 123 and accumulates elastic force with torque input from the lever-side outer race 114, restoring the lever-side outer race 114 to the neutral state with the accumulated elastic force through releasing of the input torque.

In the drawings, reference numeral 113 indicates a lever-side side plate fixed to the lever-side outer race 114 by swaging and constituting the input-side member together with the lever-side outer race 114, and reference numeral 130 denotes a washer mounted to an output shaft 122 through the intermediation of a wave washer 131.

Meanwhile, as illustrated in FIGS. 26 through 28, the brake-side clutch portion 112 mainly includes the brake-side outer race 123 serving as a stationary-side member restricted in rotation, the inner race 115 serving as a coupling member to which torque from the lever-side clutch portion 111 is input, and a plurality of pairs of cylindrical rollers 127 serving as engagement elements arranged in a gap between the brake-side outer race 123 and the output shaft 122, for controlling transmission of torque input from the inner race 115 and interrupting torque reverse-input from the output shaft 122 through engagement/disengagement between the brake-side outer race 123 and the output shaft 122.

A larger diameter portion 115c obtained by enlarging an axial end portion of the inner race 115 functions as a retainer retaining the cylindrical rollers 127 at predetermined circumferential intervals. In the drawings, reference numeral 125 denotes a brake-side side plate fixed to the brake-side outer race 123 by swaging and constituting the stationary-side member together with the brake-side outer race 123, reference numeral 128 denotes a plate spring of, for example, an N-shaped sectional configuration arranged between the cylindrical rollers 127 of each pair, and reference numeral 129 denotes a friction ring serving as a brake member mounted to the brake-side side plate 125.

Patent Document 1: JP 2003-166555 A
Patent Document 2: JP 2003-97605 A

DISCLOSURE OF THE INVENTION

Problem to be Solved by the Invention

The brake-side outer race 123, which is one of the components forming the brake-side clutch portion 112 of the conventional clutch unit disclosed in Patent Documents 1 and 2, is formed into a cup-shaped configuration by press working of a single plate-like material. Thus, the brake-side outer race 123 is formed into the cup-shaped configuration by press working, and hence there is a limitation to the thickness of a plate-like material allowing shaping. That is, it is difficult to produce the brake-side outer race 123 by press working of a plate-like material having a thickness that is larger than a fixed thickness.

Thus, it is inevitable to reduce the thickness of the brake-side outer race 123, with the result that the strength of the brake-side outer race 123 is reduced. Further, the elastic deformation amount is rather large, which makes it difficult to achieve an improvement in terms of the breaking torque of the clutch. The term breaking torque is generally used as an index of the strength of a component, and means the maximum torque applied at the point in time when the component suffers breakage.

In this context, in order to solve the above-mentioned problem, the applicants of the subject application previously proposed a clutch unit in which the brake-side outer race 123 is excellent in strength, and a decrease inelastic deformation amount and an increase in braking torque are easily achieved (Japanese Patent Application No. 2006-115218). FIG. 29 is a sectional view of an overall structure of a clutch unit previously proposed by the applicant of the subject application.

In a brake-side clutch portion 212 of the clutch unit, a brake-side outer race 223 is formed of a thick plate-like member obtained by punching. In other words, unlike the conventional clutch units disclosed in Patent Documents 1 and 2, in which the stationary-side member of the brake-side clutch portion 112 is constituted by the cup-shaped brake-side outer race 123 obtained by pressing, in the clutch unit previously proposed by the applicants of the subject application, the brake-side outer race 223 as a stationary-side member of the brake-side clutch portion 212 is formed of a plate-like member obtained by punching.

As described above, the brake-side outer race 223 is formed of a plate-like member molded by punching. With this, it is possible to obtain a brake-side outer race 223 having a large thickness and excellent in strength, and to easily achieve a decrease in elastic deformation amount and an increase in breaking torque. Note that, a cover 224 is bonded in a close contact state to an end surface 223a of the brake-side outer race 223.

Meanwhile, in a lever-side clutch portion 211 of the clutch unit, an input-side member to which torque is input with lever operation is constituted by a lever-side outer race 214 and a lever-side sideplate 213 fixed by swaging to the lever-side outer race 214. The lever-side outer race 214 and the lever-side side plate 213 are connected to an operation lever (not shown). Further, the lever-side side plate 213 is provided with claw portions 213a which are formed by bending an outer periphery of the lever-side side plate 213 and are extended to the cover 224 of the brake-side clutch portion 212, the claw portions 213a are held in contact with an end surface of the cover 224.

When the lever-side outer race 214 and the lever-side side plate 213 are rotated with lever operation, as illustrated in FIG. 30, the claw portions 213a provided to the lever-side side plate 213 slide on the end surface of the cover 224 in a rotational direction (direction indicated by arrows in the figure). In this context, on an outer periphery of the end surface of the cover 224, there are formed stopper portions 223b formed by partially bending the outer peripheral portion of the cover 224.

With this structure, when the lever-side side plate 213 is rotated with lever operation, the claw portions 213a of the lever-side side plate 213 are brought into contact with the stopper portions 223b protruding from the end surface of the cover 224, the claw portions 213a sliding on the end surface of the cover 224. In this manner, rotation of the lever-side outer race 214, that is, an operating angle of the operation lever is regulated.

In order to increase abrasion resistance against sliding described above of the claw portions 213a of the lever-side side plate 213 of the lever-side clutch portion 211, it has been necessary to perform thermal treatment on the cover 224 constituting the brake-side clutch portion 212. Further, strength of the brake-side outer race 223 provided integrally with the cover 224 is required, and hence thermal treatment is normally performed thereon. As in this case, when both the brake-side outer race 223 and the cover 224 thereof are subjected to thermal treatment, cost of the clutch unit may be increased.

Under the circumstance, the present invention has been proposed to solve the above-mentioned problem. It is therefore an object of the present invention to provide a clutch unit in which abrasion resistance of the brake-side outer race and the stopper contact portions is secured and which is produced at lower cost.

Means for Solving the Problem

A clutch unit according to the present invention includes: a lever-side clutch portion provided on an input side, for controlling transmission/interruption of rotational torque to an output side with lever operation; a brake-side clutch portion provided on an output side, for transmitting torque input from the lever-side clutch portion to the output side and for interrupting torque reverse-input from the output side.

In the present invention, the lever-side clutch portion includes an input-side member to which torque is input with the lever operation, claw portions extending in an axial direction are provided on an outer periphery of the lever-side outer race of the input-side member, and the brake-side clutch portion includes a stationary-side member restricted in rotation, the stationary-side member being constituted by a brake-side outer race arranged while being separated from the lever-side outer race in the axial direction and a cover attached to the brake-side outer race on a lever-side outer race side thereof.

As a technical means for achieving the above-mentioned object, in the clutch unit of the present invention, claw portions of the lever-side outer race are brought into slidable contact with an end surface of the brake-side outer race with rotation of the lever-side outer race, the rotation being effected with lever operation, and the claw portions of the lever-side outer race are allowed to come into contact, in a rotational direction, with lock portions provided on an outer periphery of the cover.

In the present invention, the claw portions of the lever-side outer race are brought into slidable contact with the end surface of the brake-side outer race with rotation performed with lever operation. Thus, the claw portions of the lever-side outer race are not brought into contact with the end surface of the cover, and hence it is unnecessary to perform thermal treatment on the cover. As a result, it suffices that thermal treatment is performed only on the lever-side outer race and the brake-side outer race. Further, the claw portions of the lever-side outer race are allowed to come into contact with, in the rotational direction, the lock portions provided on the outer periphery of the cover. With this, without bringing the claw portions of the lever-side outer race into sliding contact with the end surface of the cover, it is possible to regulate an operating angle of an operation lever by regulating the rotation of the lever-side outer race.

In the present invention, it is desired that the lock portions provided to the cover of the brake-side clutch portion be formed by stepping. The cover is molded by pressing, and hence shear droop is formed on the sectional surface thereof. Thus, there is a risk that contact areas between the lock portions and the lever-side outer race are reduced. When the lock portions are not formed by stepping, there is a risk that the claw portions of the lever-side outer race climb over the lock portions owing to deformation of the lock portions, with the result that the function as stoppers is not fulfilled. In contrast, when those lock portions are formed by stepping, it is possible to perform positional adjustment for reliably bringing the claw portions of the lever-side outer race into contact therewith, which is advantageous in being capable of reliably regulating an operating angle of the operation lever.

It is desired that the present invention adopt the structure including: elastic members which are arranged between the input-side member of the lever-side clutch portion and the stationary-side member of the brake-side clutch portion so as to accumulate elastic force obtained by the torque input from the input-side member and to restore the input-side member to a neutral state by releasing the elastic force obtained by the torque input therefrom and thus accumulated; and a depressed portion formed by local bending and molding of a part corresponding to the elastic members of the input-side member, for partially accommodating the elastic members. Note that, this structure is advantageous in a case where the elastic members include plate-like spring members.

Specific description is made of the above case where the depressed portion is formed by local bending and molding of the part corresponding to the elastic members of the input-side member, for partially accommodating the elastic members. By partially accommodating the elastic members in the depressed portion, an axial dimension of the input-side member can be reduced correspondingly to the depressed portion. As a result, it is possible to reduce an axial dimension of the entire clutch unit, and hence possible to easily achieve compactification of the entire clutch unit. Note that, the depressed portion is formed by local bending and molding. Thus, axial dimension (thickness) of the part corresponding to the elastic members of the input-side member is not reduced, and hence strength of the input-side member is easily secured.

In the clutch unit, the lever-side clutch portion may include: an input-side member to which torque is input with the lever operation; a coupling member transmitting the torque input from the input-side member to the brake-side clutch portion; a plurality of engagement elements for controlling transmission/interruption of the torque input from the input-side member through engagement/disengagement between the input-side member and the coupling member; a retainer for retaining the engagement elements at predetermined intervals in a circumferential direction; a stationary-side member restricted in rotation; a first elastic member provided between the retainer and the stationary-side member, for accumulating elastic force obtained by the torque input from the input-side member and restoring the retainer to a neutral state by releasing the elastic force obtained by the torque input therefrom and thus accumulated; and a second elastic member provided between the input-side member and the stationary-side member, for accumulating the elastic force with the torque input from the input-side member and restoring the input-side member to the neutral state by releasing the elastic force obtained by the torque input therefrom and thus accumulated. Note that, it is desired that cylindrical rollers be used as engagement elements of the brake-side clutch portion.

In the clutch unit, the brake-side clutch portion may include: a coupling member to which torque input from the lever-side clutch portion is input; an output-side member from which the torque is output; a stationary-side member restricted in rotation; and a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member. Note that, it is desired that cylindrical rollers be used as engagement elements of the brake-side clutch portion.

The clutch unit according to the present invention is suitable for application to an automobile in which the lever-side clutch portion and the brake-side clutch portion are incorporated into an automobile seat-lifter section. In this case, the input-side member is connected to the operation lever, and the output-side member is coupled to the rotary member of the automobile seat-lifter section. When the clutch unit is incorporated into the automobile seat-lifter section, it is possible to increase strength of the brake-side outer race of the brake-side clutch portion and breaking torque, and possible to achieve cost reduction because it becomes unnecessary to perform thermal treatment on the cover. Thus, it is possible to provide a seat lifter section excellent in durability and reliability. Further, the axial dimension of the input-side member of the lever-side clutch portion can be reduced correspondingly to the depressed portion, and hence it is possible to easily achieve compactification of the clutch unit. As a result, the clutch unit is more easily incorporated into the seat lifter section.

Effects of the Invention

According to the present invention, the claw portions of the lever-side outer race are brought into slidable contact with the end surface of the brake-side outer race with rotation performed by lever operation. Thus, the claw portions of the lever-side outer race are not brought into contact with the end surface of the cover, and hence it is unnecessary to perform thermal treatment on the cover. As a result, it suffices that thermal treatment is performed only on the lever-side outer race and the brake-side outer race. Further, the claw portions of the lever-side outer race are allowed to come into contact with, in the rotational direction, the lock portions provided on the outer periphery of the cover. With this, without bringing the claw portions of the lever-side outer race into sliding contact with the end surface of the cover, it is possible to regulate an operating angle of an operation lever by regulating the rotation of the lever-side outer race.

As a result, while abrasion resistance of the lever-side outer race and the brake-side outer race is secured by thermal treatment, it is unnecessary to perform thermal treatment of the cover. Thus, cost reduction of the clutch unit is easily achieved.

BEST MODE FOR CARRYING OUT THE INVENTION

FIG. 1 is a sectional view of an overall structure of a clutch unit X according to an embodiment of the present invention. FIG. 2 is a right-hand side view of the clutch unit X illustrated in FIG. 1. FIG. 3 is a left-hand side view of the clutch unit X illustrated in FIG. 1. FIG. 4 is a sectional view taken along the line A-A of FIG. 1. FIG. 5 is a sectional view taken along the line B-B of FIG. 1. Further, FIGS. 6 to 16 illustrate main components of the clutch unit X.

The clutch unit X is incorporated into an automobile seat-lifter section (refer to FIGS. 23 and 24) for adjusting height of a seat with lever operation or the like. As illustrated in FIGS. 1 to 5, the clutch unit X is constituted by a lever-side clutch portion 11 provided on an input side and a brake-side clutch portion 12 which is provided on an output side and which has a function of interrupting reverse input.

As illustrated in FIGS. 1, 2, and 4, the lever-side clutch portion 11 includes a lever-side side plate 13 and a lever-side outer race 14 which serve as an input-side member to which an operation lever (not shown) or the like is connected, an inner race 15 serving as a coupling member which transmits torque from the lever-side outer race 14 to the brake-side clutch portion 12, a plurality of cylindrical rollers 16 arranged as engaging elements in wedge gaps 20 formed between an outer peripheral surface 15a of the inner race 15 and an inner peripheral surface 14a of the lever-side outer race 14, a retainer 17 for retaining the cylindrical rollers 16, an inner centering spring 18 as a first elastic member for restoring the retainer 17 to a neutral state, and an outer centering spring 19 as a second elastic member for restoring the lever-side outer race 14 to a neutral state. Note that, components are prevented from being detached by press-fitting a washer 31 onto an end portion of an output shaft 22 described later through intermediation of a wave washer 30.

As illustrated in FIGS. 1, 3, and 5, the so-called lock type brake-side clutch portion 12 which has a function of interrupting reverse input mainly includes the inner race 15 serving as a coupling member to which the torque from the lever-side clutch portion 11 is input, an output shaft 22 serving as an output-side member, the brake-side outer race 23, a cover 24, and the brake-side side plate 25 serving as the stationary-side member restricted in rotation, a plurality of pairs of cylindrical rollers 27 arranged as coupling members in the wedge gaps 26 between the brake-side outer race 23 and the output shaft 22, for controlling transmission of the torque input from the inner race 15 and interrupting torque reverse-input from the output shaft 22 through engagement/disengagement between both members, and plate springs 28 of, for example, an N-shaped sectional configuration, each provided between the cylindrical rollers 27 of each pair and serving as elastic members imparting repulsive force to the cylindrical rollers 27. Note that, protrusions 22f are provided to the output shaft 22 and inserted into holes 15d with clearances, the holes 15d being provided to the inner race 15 (refer to FIG. 1).

Next, detailed description is made of main components of the lever-side clutch portion 11 and the brake-side clutch portion 12 which are provided in the clutch unit X.

FIGS. 6a and 6b illustrate the lever-side side plate 13 of the lever-side clutch portion 11. In the lever-side sideplate 13, a hole 13a into which the output shaft 22 and the inner race 15 are inserted is formed in a center portion thereof, and a plurality of (five, for example) claw portions 13b are provided in a protruding manner on an outer peripheral portion thereof. Those claw portions 13b are bent and molded in an axial direction so as to have bisected distal ends. Then, the claw portions 13b are inserted into cutout recessed portions 14e (refer to FIG. 7c) of the lever-side outer race 14, the cutout recessed portions 14e being described later. Lastly, the distance between each of the bisected distal ends is increased outward. In this manner, the lever-side side plate 13 is fixed to the lever-side outer race 14 by swaging. Note that, in the figures, a plurality of (four, for example) holes are represented by reference symbol 13c, the holes allowing the operation lever (not shown) for adjusting height of a seat to be attached to the lever-side side plate 13.

FIGS. 7a to 7c illustrate the lever-side outer race 14. The lever-side outer race 14 is obtained by molding a plate-like material into a cup-shape through press working, and includes a hole 14b which is formed in a center portion 14c through which the output shaft 22 and the inner race 15 are inserted. On an inner periphery of a cylindrical portion 14d extending from the center portion 14c in the axial direction, a plurality of cam surfaces 14a are equiangularly formed (refer to FIG. 4).

On an outer peripheral portion of the lever-side outer race 14, a plurality of (three, for example) claw portions 14f and 14g are provided in a protruding manner and bent and molded in the axial direction. Of those claw portions 14f and 14g, the one claw portion 14f is locked by being inserted and arranged between two lock portions 19a of an outer centering spring 19 described later. In a state of being in contact with an end surface of a brake-side outer race 23 described later, the other two claw portions 14g slide on the end surface of the brake-side outer race 23 in accordance with rotation of the lever-side outer race 14, and are allowed to be brought into contact, in a rotational direction, with two lock portions 24e and 24f provided on an outer periphery of a cover 24 and serving as rotation stoppers. In this manner, an operating angle of the operation lever is regulated.

Further, the plurality of (five in the figure) cutout recessed portions 14e into which the claw portions 13b (refer to FIGS. 6a and 6b) of the lever-side side plate 13 are formed on an outer periphery of the lever-side outer race 14. By swaging the claw portions 13b of the lever-side side plate 13, the lever-side side plate 13 and the lever-side outer race 14 are connected to each other, the claw portions 13b being inserted into the cutout recessed portions 14e. The lever-side outer race 14 and the lever-side side plate 13 fixed by swaging to the lever-side outer race 14 constitute the input-side member of the lever-side clutch portion 11.

As illustrated in FIG. 7(a), in the lever-side outer race 14, a protrusion 14h protruding toward the lever-side side plate 13 is formed by being locally bent and molded. A depressed portion 14i is formed on the cover 24 side of the protrusion 14h, and hence it is possible to set an axial dimension of the lever-side outer race 14 to be smaller than that in a case where the protrusion 14h is not formed (refer to the broken line portion of FIG. 7a) ($M_1 < M_2$). As a result, it is possible to set an axial dimension M (refer to FIG. 1) of the entire clutch unit to be smaller than that in a case where the protrusion 14h of the lever-side outer race 14 is not formed. Thus, compactification of the clutch unit is easily achieved. Further, owing to the depressed portion 14i of the protrusion 14h, it is possible to enlarge a space by an axial dimension ($M_2 - M_1$), and hence an accommodating space for the outer centering spring 19 is easily secured. As a result, the clutch unit is more easily incorporated into the seat lifter section, and hence the seat lifter section can be downsized.

FIGS. 8a and 8b illustrate the inner race 15. The inner race 15 is provided with the outer peripheral surface 15a formed on an outer diameter of a cylindrical portion 15b into which the output shaft 22 is inserted, the wedge gaps 20 (refer to FIG. 4) being formed between the outer peripheral surface 15a and the cam surfaces 14a of the lever-side outer race 14. Further, a larger diameter portion 15c is integrally formed at an end portion of the cylindrical portion 15b. In order to cause the inner race 15 to function as a retainer on the brake-side clutch portion 12, the pockets 15e for accommodating the cylindrical rollers 27 and the plate springs 28 are equiangularly formed in the larger diameter portion 15c. Note that, in the figures, a plurality of holes into which the protrusions 22f of the output shaft 22 (refer to FIG. 1) are inserted with clearances are represented by reference symbol 15d.

FIGS. 9a to 9c illustrate the retainer 17 made of a resin. The retainer 17 is a cylindrical member in which a plurality of pockets 17a for accommodating the cylindrical rollers 16 are equiangularly formed. Two cutout recessed portions 17b are formed in an end portion on one side of the retainer 17, and lock portions 18a of the above-mentioned inner centering spring 18 are locked to adjacent two end surfaces 17c of the respective cutout recessed portions 17b.

FIGS. 10a to 10c illustrate the inner centering spring 18. The inner centering spring 18 is a spring member having a rectangular C-shape in cross-section and a pair of the lock portions 18a bent to a radially inner side, and is positioned on a radially inner side of the outer centering spring 19 (refer to FIG. 1). The inner centering spring 18 is rectangular in cross-section, and hence is small in axial dimension. Thus, an axial dimension of a space in which the inner centering spring 18 is arranged is reduced between the lever-side clutch portion 11 and the brake-side clutch portion 12. As a result, compactification of the clutch unit is achieved. Further, the shape of the inner centering spring 18 in cross-section is angular, and hence it is possible to obtain a spring constant higher that of a spring having a round shape in cross-section. As a result, a restoring force at the time of releasing torque can be easily increased.

As illustrated in FIG. 17, the inner centering spring 18 is arranged between the retainer 17 and the cover 24 serving as a stationary-side member of the brake-side clutch portion 12. In addition, both the lock portions 18a are locked to the two end surfaces 17c (refer to FIG. 9b) of the retainer 17 and locked to a claw portion 24b (refer to FIGS. 14a and 14b) provided to the cover 24.

In the inner centering spring 18, at the time of application of torque input from the lever-side outer race 14, one of the lock portions 18a is engaged with one of the end surfaces 17c of the retainer 17, and the other of the lock portions 18a is engaged with the claw portion 24b of the cover 24, respectively. Thus, the inner centering spring 18 is extended in accordance with rotation of the lever-side outer race 14 so as to accumulate elastic force. At the time of releasing the torque input from the lever-side outer race 14, the retainer 17 is restored to a neutral state with the elastic restoring force.

FIGS. 11a and 11b illustrate the outer centering spring 19. The outer centering spring 19 is a plate-like spring member having a C-shape and the pair of lock portions 19a formed by bending both the ends thereof to a radially outer side, and is positioned on a radially outer side of the inner centering spring 18 (refer to FIG. 1). Further, while being regulated in radial position with a raised portion 24g (refer to FIG. 1) provided on an input-side end surface of the cover 24 as described later, the outer centering spring 19 is arranged in a space formed between the cover 24 and the lever-side outer race 14.

Owing to its plate-like shape, the outer centering spring 19 is larger in axial dimension than the inner centering spring 18. In this context, the protrusion 14h is formed on the lever-side outer race 14 as described above, and the accommodating space for the outer centering spring 19 is easily secured with the depressed portion 14i of the protrusion 14h thus formed.

The outer centering spring 19 is arranged between the lever-side outer race 14 of the lever-side clutch portion 11 and the cover 24 of the brake-side clutch portion 12. As illustrated in FIG. 17, both the lock portions 19a are locked to the claw portion 14f provided to the lever-side outer race 14 locked to a claw portion 24d provided to the cover 24 (refer to FIGS. 7a to 7c and FIGS. 14a and 14b). The lock portions 19a are arranged while being displaced (by 180°) in a circumferential direction with respect to the lock portions 18a of the inner centering spring 18.

In the outer centering spring 19, when the torque input from the lever-side outer race 14 is applied so as to rotate the lever-side outer race 14, one of the lock portions 19a is engaged with the claw portion 14f of the lever-side outer race 14, and the other of the lock portions 19a is engaged with the claw portion 24d of the cover 24, respectively. Thus, the outer centering spring 19 is extended in accordance with the rotation of the lever-side outer race 14 so as to accumulate elastic force. When the torque input from the lever-side outer race 14 is released, the lever-side outer race 14 is restored to a neutral state with the elastic restoring force.

Note that, when the outer centering spring 19 is extended in the circumferential direction, a radially outward force is applied to the lock portions 19a, and the outer centering spring 19 are subjected to displacement in radial direction. However, the outer centering spring 19 is regulated in radial position with the raised portion 24g of the cover 24 (refer to FIGS. 14a, 14b, and 17). Thus, it is possible to prevent displacement thereof in the radial direction, and hence possible to reliably and stably actuate the outer centering spring 19.

As described above, the outer centering spring 19 is regulated in radial position with the raised portion 24g of the cover 24. Thus, it is unnecessary to provide a structure for regulating displacement to the outer centering spring 19 itself. As a result, a shape of the outer centering spring 19 can be simplified, which leads to excellent workability of the outer centering spring 19 and cost reduction thereof.

FIGS. 12a to 12c illustrate the output shaft 22. In the output shaft 22, a larger diameter portion 22d extending from a shaft portion 22c to the radially outer side and increased in diameter is integrally formed in a center portion in the axial direction, a plurality of (six, for example) flat cam surfaces 22a are equiangularly formed on an outer peripheral surface of the larger diameter portion 22d, the two cylindrical rollers 27 and the plate spring 28 are arranged in each wedge gap 26 (refer to FIG. 5) provided between the cam surfaces 22a and an inner peripheral surface 23b of the brake-side outer race 23. In an end surface on one side of the larger diameter portion 22d, there is formed an annular recessed portion 22b in which a friction ring 29 is accommodated and arranged. Further, in the figures, protrusions formed on an end surface on the other side of the larger diameter portion 22d are represented by reference symbol 22f, the protrusions being inserted into the holes 15d of the inner race 15 with clearances (refer to FIGS. 1, 8a, and 8b).

FIGS. 13a and 13b and FIGS. 14a and 14b illustrate the brake-side outer race 23 and the cover 24 thereof. The brake-side outer race 23 is formed of a thick plate-like member obtained by punching of a single material, and the cover 24 is molded by pressing of another single material. FIGS. 15a and 15b illustrate a brake-side side plate 25. The brake-side outer race 23 and the cover 24 are integrally fixed to each other with the brake-side side plate 25 by swaging. Note that, a hole into which the output shaft 22 is inserted is represented by reference symbol 25b, and holes with which protrusions 29a of the friction ring 29 are fitted are represented by reference symbol 25c, the protrusions 29a being described later.

A plurality of (three) cutout recessed portions 23a are formed on an outer periphery of the brake-side outer race 23. Correspondingly to the cutout recessed portions 23a, a plurality of (three) cutout recessed portions 24a are similarly formed on an outer periphery of the cover 24. Claw portions 25a of the brake-side side plate 25 are inserted into the cutout recessed portions 23a and 24a (refer to FIG. 18a). By swaging the claw portions 25a of the brake-side side plate 25, the brake-side outer race 23 and the cover 24 are coupled with each other and integrated with the brake-side side plate 25 (refer to FIG. 18b), the claw portions 25a being inserted into the cutout recessed portions 23a and 24a. As illustrated in FIGS. 18a and 18b, swaging of the claw portions 25a of the brake-side sideplate 25 is performed by increasing outward the distance between the bisected distal end portions of each of the claw portions 25a.

The wedge gaps 26 are formed between the inner peripheral surface 23b of the brake-side outer race 23 and the cam surfaces 22a of the output shaft 22 (refer to FIG. 5). The cover 24 is provided with the claw portion 24b protruding in the axial direction, the claw portion 24b being arranged between the two lock portions 18a of the inner centering spring 18 of the lever-side clutch portion (refer to FIGS. 10b and 17).

The claw portion 24b of the cover 24 is formed by raising the surface of the cover 24 on a radially outer side of the claw-portion-formation portion. As in this case, when the claw portion 24b is formed by raising the surface of the cover 24 on the radially outer side of the claw-portion-formation portion, without deteriorating circularity of a punched hole 24c formed at the center of the cover 24, it is possible to secure accuracy (circularity) of the punched hole 24c.

Further, a claw portion 24d protruding in the axial direction is formed on the outer periphery of the cover 24. The claw portion 24d is arranged between the two lock portions 19a of the outer centering spring 19 of the lever-side clutch portion 11 (refer to FIGS. 11a and 17). On the inside of the outer periphery of the cover 24, the raised portion 24g is formed coaxially with the punched hole 24c. With the raised portion 24g, the outer centering spring 19 is regulated in radial position. Further, two pairs of the lock portions 24e and 24f are formed by stepping on the outer periphery of the cover 24.

As illustrated in FIG. 19, those lock portions 24e and 24f are provided on the outer periphery of the lever-side outer race 14. In a state where the cover 24 is held in contact with the end surface of the brake-side outer race 23, in accordance with rotation of the lever-side outer race 14, the lock portions 24e and 24f are allowed to be brought into contact, in a rotational direction, with the claw portions 14g sliding on the end surface of the brake-side outer race 23. As a result, the lock portions 24e and 24f function as rotation stoppers for regulating an operating angle of the operation lever. In other words, when the lever-side outer race 14 is rotated with operation of the operation lever, the claw portions 14g thereof move along the outer periphery of the cover 24 between the lock portions 24e and 24f of the cover 24.

Incidentally, both the brake-side outer race 23 and the cover 24 are normally subjected to thermal treatment for the purpose of increasing abrasion resistance. In contrast, the claw portions 14 of the lever-side outer race 14 slide on the end surface of the brake-side outer race 23 as described above, and hence abrasion resistance can be increased by thermal treatment only on the brake-side outer race 23. As a result, it is unnecessary to perform thermal treatment on the cover 24.

As described above, the brake-side outer race 23 is formed of a thick plate-like member obtained by punching of a single material. With this, it is possible to obtain a brake-side outer race 23 excellent in strength, and to easily achieve a decrease in elastic deformation amount and an increase in braking torque. In addition, thermal treatment is effected only on the brake-side outer race 23 requiring high strength and it is unnecessary to effect thermal treatment on the cover 24 because strength of the cover 24 is less required. As a result, cost reduction can be achieved.

Note that, when the lock portions 24e and 24f which function as rotation stoppers for regulating an operating angle of the operation lever are not formed by stepping, the cover 24 is not subjected to thermal treatment and hence is poor in strength. In addition, there is a risk that the claw portions 14g of the lever-side outer race 14 climb over the lock portions 24e and 24f owing to deformation of the lock portions 24e and 24f, with the result that the function as stoppers is not fulfilled. Thus, when those lock portions 24e and 24f are formed in a shape of being raised by stepping (refer to FIG. 19), it is possible to perform positional adjustment for reliably bringing the claw portions 14g of the lever-side outer race 14 into contact therewith, which is advantageous in being capable of reliably regulating, as rotation stoppers, an operating angle of the operation lever.

Incidentally, the cylindrical rollers 27, which are engaged/detached between the inner peripheral surface 23b and the cam surfaces 22a of the larger diameter portion 22d of the output shaft 22, move on the inner peripheral surface 23b of the brake-side outer race 23. Thus, as indicated by the solid arrow in FIG. 20a, the inner peripheral surface 23b of the brake-side outer race 23 is subjected to surface treatment (shaving) from one end to the other end thereof in the axial direction. As a result of the shaving, burrs a may occur on the other end side of the inner peripheral surface 23b of the brake-side outer race 23 as illustrated in FIG. 20b.

As a countermeasure, a chamfered portion 23c is formed on the other end side of the inner peripheral surface 23b of the brake-side outer race 23. When the chamfered portion 23c is formed as in this case, even when the burrs a occur on the other end side of the inner peripheral surface 23b as a result of shaving, the burr a do not protrude from an end surface 23d of the brake-side outer race 23. Accordingly, even when the brake-side side plate 25 is bonded to the end surface 23d on the other end side of the brake-side outer race 23, high degree of adhesion can be easily secured between the brake-side outer race 23 and the brake-side side plate 25. As a result, it is possible to prevent reduction in torque capacity and occurrence of engagement failure caused by clogging of foreign matters.

Note that, as illustrated in FIG. 21 in an enlarged manner, in the case that the end portions 22g of the outer peripheral surfaces (cam surfaces) 22a of the larger diameter portion 22d of the output shaft 22 have an R-shape, when the brake-side side plate 25 is bonded to the end surface 23d on the other end side of the brake-side outer race 23, owing to the presence of the chamfered portion 23c on the other end side of the inner peripheral surface 23b of the brake-side outer race 23, an axial effective length $L_1$ of the cylindrical rollers 27 is set, the cylindrical rollers 27 rolling between the outer peripheral surface 22a of the larger diameter portion 22d of the output shaft 22 and the inner peripheral surface 23b of the brake-side outer race 23.

As illustrated in FIG. 22 in an enlarged manner, when the cover 24 is bonded to the end surface 23d on the other end side of the brake-side outer race 23, the chamfered portion 23c of the inner peripheral surface 23b of the brake-side outer race 23 and the R-shaped end portions 22g of the outer peripheral surface 22a of the larger diameter portion 22d of the output shaft 22 are arranged on the same side in the axial direction. Note that, in this case, on the one end side of the inner peripheral surface 23b of the brake-side outer race 23 bonded to the brake-side side plate 25, burrs do not occur from the direction of shaving. Thus, high degree of adhesion is secured between the brake-side outer race 23 and the brake-side side plate 25.

With this, it is possible to set an axial effective length $L_2$ of the cylindrical rollers 27 to be larger than the axial effective length $L_1$ in the above-mentioned case, in other words, the case where the chamfered portion 23c of the inner peripheral surface 23b of the brake-side outer race 23 is arranged on the side opposite in the axial direction to the R-shaped end portions 22g of the outer peripheral surface 22a of the larger diameter portion 22d of the output shaft 22 (refer to FIG. 21) ($L_2 > L_1$). As a result, it is possible to achieve the following: an increase in torque capacity, stabilization of engagement/detachment of the cylindrical rollers 27, and securing of operational stability of the clutch unit.

On the outer periphery of the above-mentioned brake-side side plate 25, one flange portion 25e and two flange portions 25f are provided as clutch attachment portions with respect to the seat lifter section (refer to FIGS. 2 to 4). In distal end portions of those three flange portions 25e and 25f, by boring, there are formed attachment holes 25g and 25h for allowing attachment with respect to the seat lifter section, and there are formed, in the axial direction, cylindrical portions 25i and 25j in a manner of surrounding the attachment holes 25g and 25h.

FIGS. 16a to 16c illustrate the friction ring 29 made of a resin. On an end surface of the friction ring 29, the plurality of circular protrusions 29a are equiangularly formed. By press-fitting the protrusions 29a into the holes 25c of the brake-side side plate 25, the friction ring 29 is fixed to the brake-side side plate 25 (refer to FIGS. 1 and 3).

In the case of press-fitting of the protrusions 29a, engagement state with the holes 25c can be achieved owing to elastic deformation of the protrusions 29a made of a resin material. By adopting a press-fit engagement structure of the protrusions 29a and the holes 25c, it is possible to prevent the friction ring 29 from falling off from the brake-side sideplate 25 owing to handling during transportation or the like. As a result, it is possible to increase handling properties at the time of assembly.

Note that, a sectional shape of the protrusions 29a is not limited to a columnar shape. Examples of the sectional shape may include a conical trapezoidal shape and a stepped columnar shape. When the protrusions 29a of the friction ring 29 have a conical trapezoidal shape or a stepped columnar shape, inserting operation with respect to the holes 25c of the brake-side side plate 25 is more easily performed in comparison with the case of a columnar shape. In addition, falling-off caused by press-fitting in the engagement structure is more reliably prevented.

The friction ring 29 is press-fitted to an inner peripheral surface 22e of the annular recessed portion 22b formed in the larger diameter portion 22d of the output shaft 22 with an interference (refer to FIGS. 12a and 12b). Owing to a frictional force generated between an outer peripheral surface 29c of the friction ring 29 and the inner peripheral surface 22e of the annular recessed portion 22b of the output shaft 22, rotational resistance is imparted to the output shaft 22. Degree of the rotational resistance may be appropriately set in consideration of degree of reverse-input torque input to the output shaft 22.

On the outer peripheral surface 29c of the friction ring 29, there are equiangularly formed a plurality of groove-like slits 29b (refer to FIG. 5). With provision of the slits 29b as in this case, elastic force may be imparted to the friction ring 29. Thus, a rate of change in sliding torque is not increased with respect to inner diameter tolerance of the inner peripheral surface 22e of the output shaft 22 and outer diameter tolerance of the outer peripheral surface 29c of the friction ring 29.

In other words, it is possible to reduce a setting range of rotational resistance imparted by the frictional force generated between the outer peripheral surface 29c of the friction ring 29 and the inner peripheral surface 22e of the annular recessed portion 22b of the output shaft 22, and hence possible to appropriately and easily set the degree of the rotational resistance. Further, the slits 29b double as grease pools, and hence it is possible to suppress abrasion of the outer peripheral surface 29c of the friction ring 29 owing to sliding with respect to the inner peripheral surface 22e of the annular recessed portion 22b of the output shaft 22.

Description is made on operation of the lever-side clutch portion 11 and the brake-side clutch portion 12 of the clutch unit X structured as described above.

In the lever-side clutch portion 11, when the input torque is applied to the lever-side outer race 14, the cylindrical rollers 16 are engaged into the wedge gaps 20 between the lever-side outer race 14 and the inner race 15. The inner race 15 is rotated with torque transmitted to the inner race 15 through intermediation of the cylindrical rollers 16. Simultaneously, elastic force is accumulated in both the centering springs 18 and 19 in accordance with rotation of the lever-side outer race 14 and the retainer 17. When the input torque is interrupted, the lever-side outer race 14 and the retainer 17 are restored to a neutral state with the elastic force of both the centering springs 18 and 19. Meanwhile, the inner race 15 is maintained at the fixed rotational position. Accordingly, the inner race 15 is rotated in an inching manner with repetitive rotation of the lever-side outer race 14, in other words, pumping operation of the operation lever.

In the brake-side clutch portion 12, when reverse-input torque is input to the output shaft 22, the cylindrical rollers 27 are engaged into the wedge gaps 26 between the output shaft 22 and the brake-side outer race 23 so as to lock the output shaft 22 with respect to the brake-side outer race 23. Accordingly, the torque reverse-input from the output shaft 22 is locked by the brake-side clutch portion 12 so as to interrupt flow of the torque reverse-input to the lever-side clutch portion 11.

Meanwhile, description is made on the case where the torque input from the lever-side outer race 14 is input to the inner race 15 through intermediation of the lever-side clutch portion 11. When the inner race 15 is brought into contact with the cylindrical rollers 27 and presses the cylindrical rollers 27 against elastic force of the plate springs 28, the cylindrical rollers 27 are detached from the wedge gaps 26 and a locked state of the output shaft 22 is released. As a result, the output shaft 22 is allowed to be rotated. When the inner race 15 is further rotated, clearances between the holes 15d of the inner race 15 and the protrusions 22f of the output shaft 22 are eliminated, and the inner race 15 is brought into contact with the protrusions 22f of the output shaft 22 in a rotational direction. As a result, the torque input from the inner race 15 is transmitted to the output shaft 22 through intermediation of the protrusions 22f, and the output shaft 22 is rotated.

The clutch unit X provided with a structure as described above in detail is used while being incorporated into, for example, an automobile seat-lifter section. FIG. 23 illustrates a seat 40 installed in a cabin of an automobile. The seat 40 includes a sitting seat 40a, a backrest seat 40b, and a seat lifter section 41 for adjusting a height H of the sitting seat 40a. Adjustment of the height H of the sitting seat 40a is performed with an operation lever 41a of the seat lifter section 41.

FIG. 24a is a conceptual view of a structural example of the seat lifter section 41. One ends of link members 41c and 41d are pivotally attached to a slide movable member $41b_1$ of a seat slide adjuster 41b. The other ends of the link members 41c and 41d are pivotally attached to the sitting seat 40a. The other end of the link member 41c is pivotally attached to a sector gear 41f through intermediation of a link member 41e. The sector gear 41f is pivotally attached to the sitting seat 40a, and rockable about a fulcrum $41f_1$. The other end of the link member 41d is pivotally attached to the sitting seat 40a.

The clutch unit X described above in this embodiment is fixed to an appropriate position of the sitting seat 40a. Fixation to the sitting seat 40a of the clutch unit X is fixation by swaging to a seat frame 40c of the sitting seat 40a, in which the three flange portions 25e and 25f of the brake-side side plate 25 are subjected to plastic deformation in a manner that the distal end portions of the cylindrical portions 25i and 25j are increased in diameter to the outside (refer to FIG. 25).

Meanwhile, the operation lever 41a made of, for example, a resin is coupled to the lever-side side plate 13 of the lever-side clutch portion 11, and a pinion gear 41g meshing with the sector gear 41f as a rotary member is provided to the output shaft 22 of the brake-side clutch portion 12. As illustrated in FIGS. 1, 12a, and 12b, the pinion gear 41g is integrally formed at a shaft end of the output shaft 22.

The friction ring 29 is press-fitted to the inner peripheral surface 22e of the annular recessed portion 22b formed in the larger diameter portion 22d of the output shaft 22 with an interference (refer to FIG. 1). In this case, only with the interference in the radial direction, it may be difficult to impart sufficient rotational resistance in terms of durability and assembling properties of the clutch.

As a countermeasure, in addition to the above-mentioned friction ring 29, as illustrated in FIG. 25, an elastic member 42 such as a coil spring is interposed as a rotational resistance imparting member between a seat frame 40d through which the output shaft 22 is rotatably passed and the output shaft 22.

With the elastic member 42, rotational resistance can be imparted between the seat frame 40d as a stationary-side member and the output shaft 22 from outside of the clutch. In addition, sufficient rotational resistance is more easily imparted without increasing the interference of the friction ring 29. Note that, as the rotational resistance imparting member, a frictional member may be used instead of the above-mentioned elastic member 42.

In FIG. 24b, when the operation lever 41a is rock-operated counterclockwise (upward), torque input in that direction is transmitted to the pinion gear 41g through intermediation of the clutch unit X so as to counterclockwise pivot the pinion gear 41g. Then, the sector gear 41f meshing with the pinion gear 41g rocks clockwise so as to pull the other end of the link member 41c through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with elastic force of the two centering springs 18 and 19 and returns to the original position (restores to the neutral state). Note that, when the operation lever 41a is rock-operated clockwise (downward), the seat surface of the sitting seat 40a is lowered with operation in an opposite direction as that in the case described above. Further, when the operation lever 41a is released after adjustment of the height, the operation lever 41a pivots counterclockwise and returns to the original position (restores to the neutral state).

The present invention is not limited to the foregoing description in this embodiment. As a matter of course, the present invention may be carried out in various modes without departing from the spirit of the present invention. The scope of the present invention is defined by claims, and includes the meaning of an equivalent of the claims and all the modifications within the claims.

BRIEF DESCRIPTION OF THE DRAWINGS

FIG. 6b is a left-hand side view of FIG. 6a.
FIG. 7b is a left-part side view of FIG. 7a.
FIG. 7c is a right-hand side view of FIG. 7a.
FIG. 8b is a left-hand side view of FIG. 8a.
FIG. 9b is a left-hand side view of FIG. 9a.
FIG. 9c is a sectional view of FIG. 9a.
FIG. 10b is a right-hand side view of FIG. 10a.
FIG. 11b is a partially enlarged bottom view of FIG. 11a.
FIG. 12b is a left-hand side view of FIG. 12a.
FIG. 12c is a right-hand side view of FIG. 12a.
FIG. 13b is a left-hand side view of FIG. 13a.
FIG. 14a is a sectional view of a cover.
FIG. 14b is a left-hand side view of FIG. 14a.
FIG. 15a is a sectional view of a brake-side side plate.
FIG. 15b is a right-hand side view of FIG. 15a.
FIG. 16a is a front view of a friction ring.
FIG. 16b is a left-hand side view of FIG. 16a.
FIG. 16c is a right-hand side view of FIG. 16a.
FIG. 24b is an enlarged view of a main part of FIG. 24a.

Figure 1:
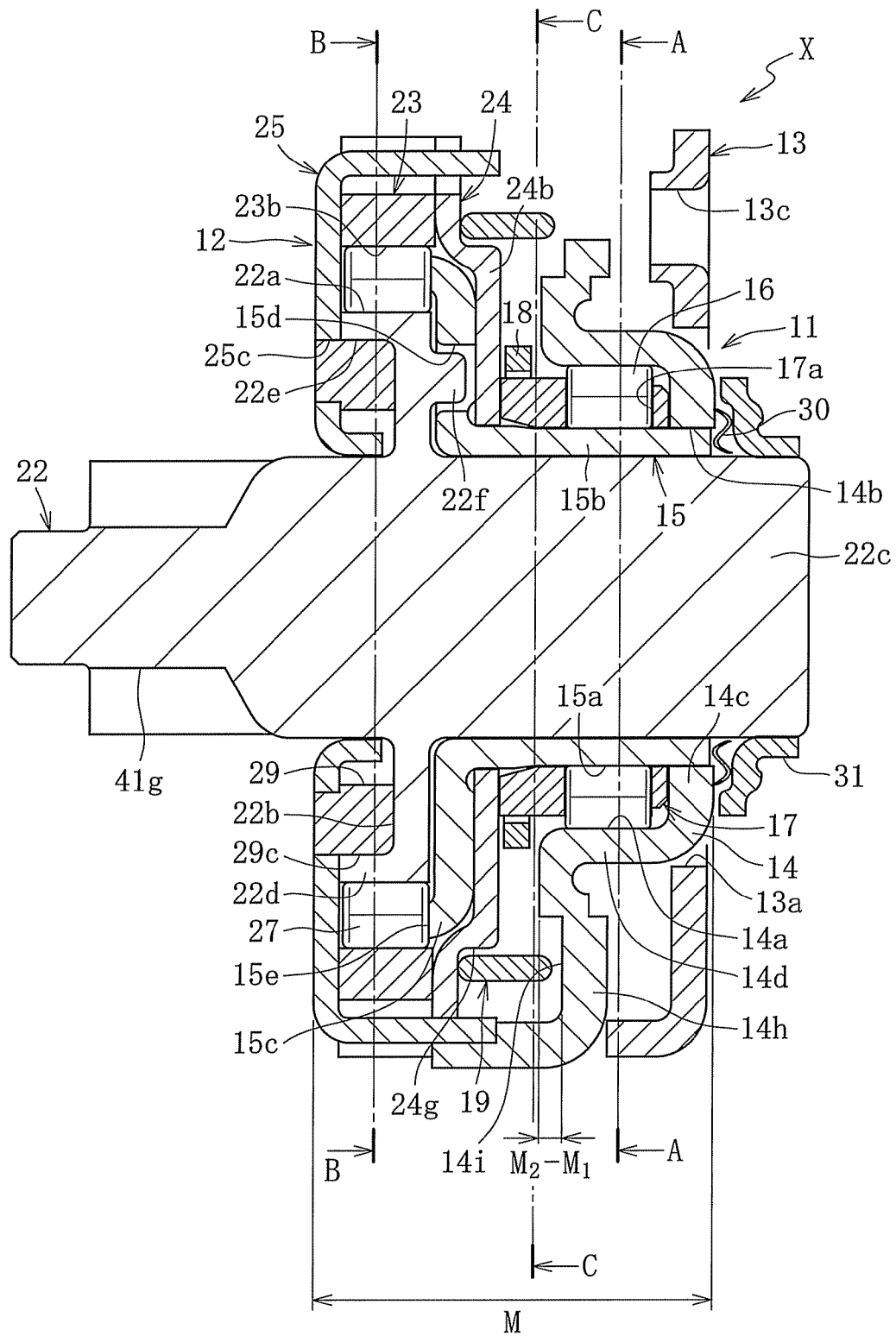
FIG. 1 is a sectional view of an overall structure of a clutch unit according to an embodiment of the present invention.
Figure 2:
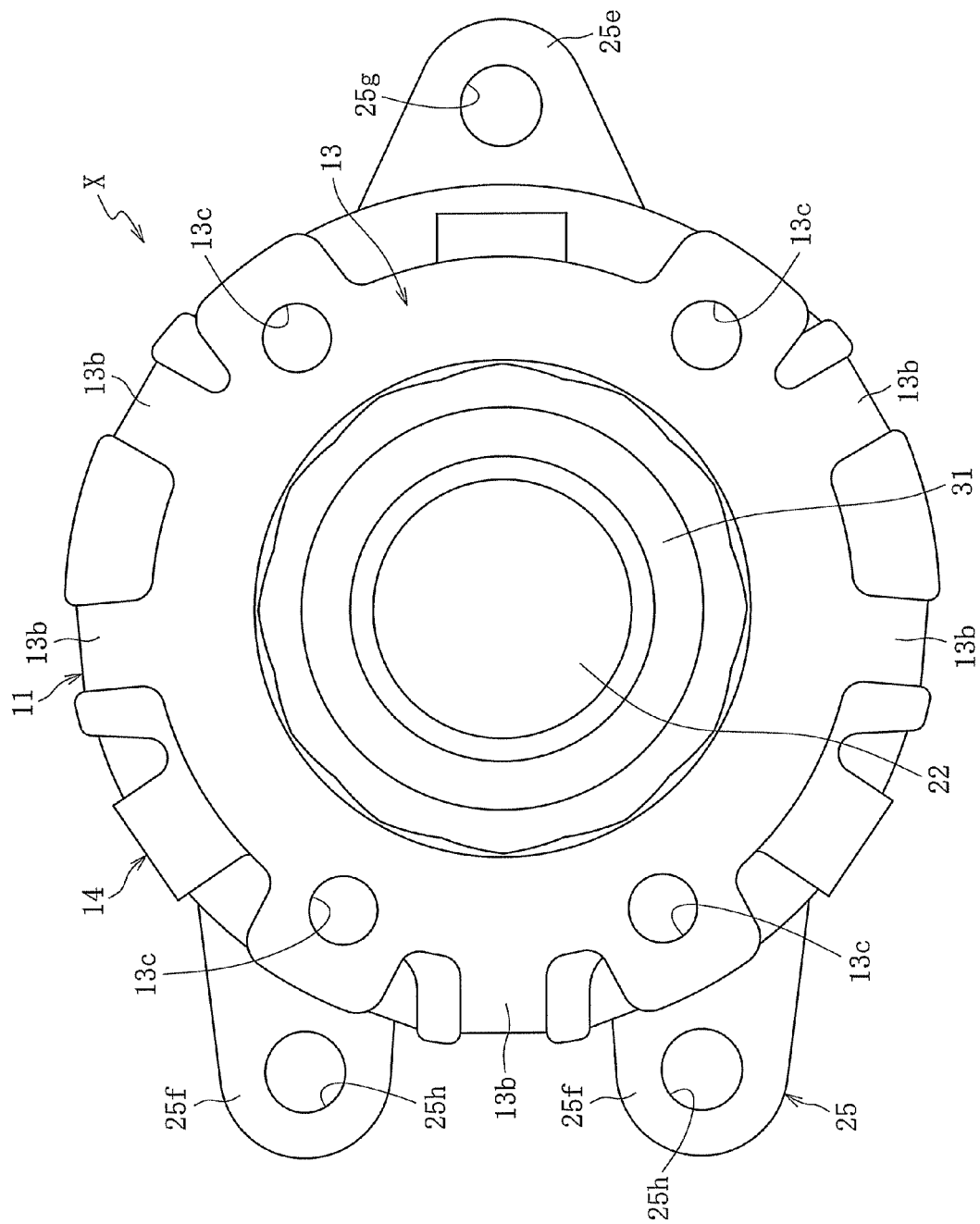
FIG. 2 is a right-hand side view of FIG. 1.
Figure 3:
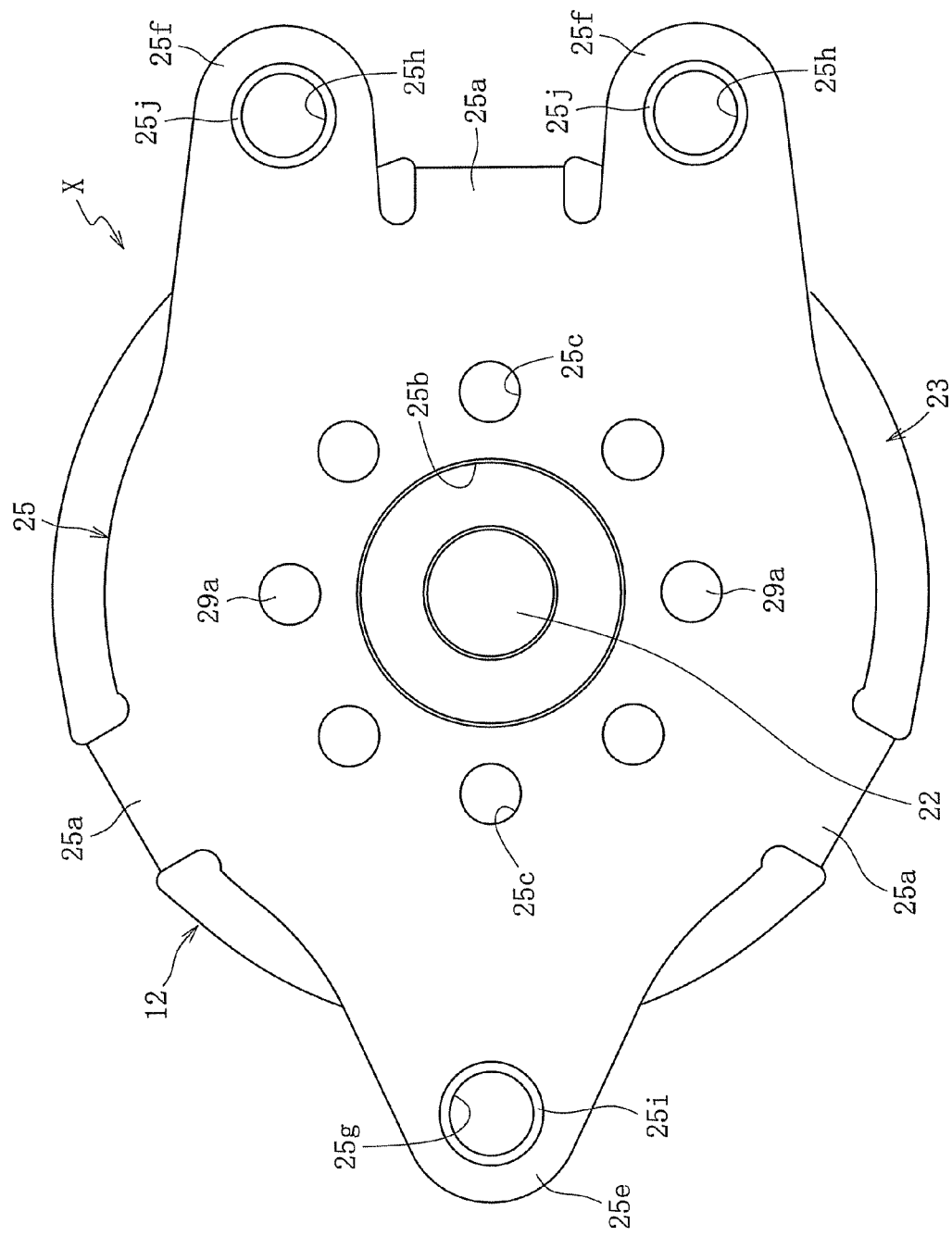
FIG. 3 is a left-hand side view of FIG. 1.
Figure 4:
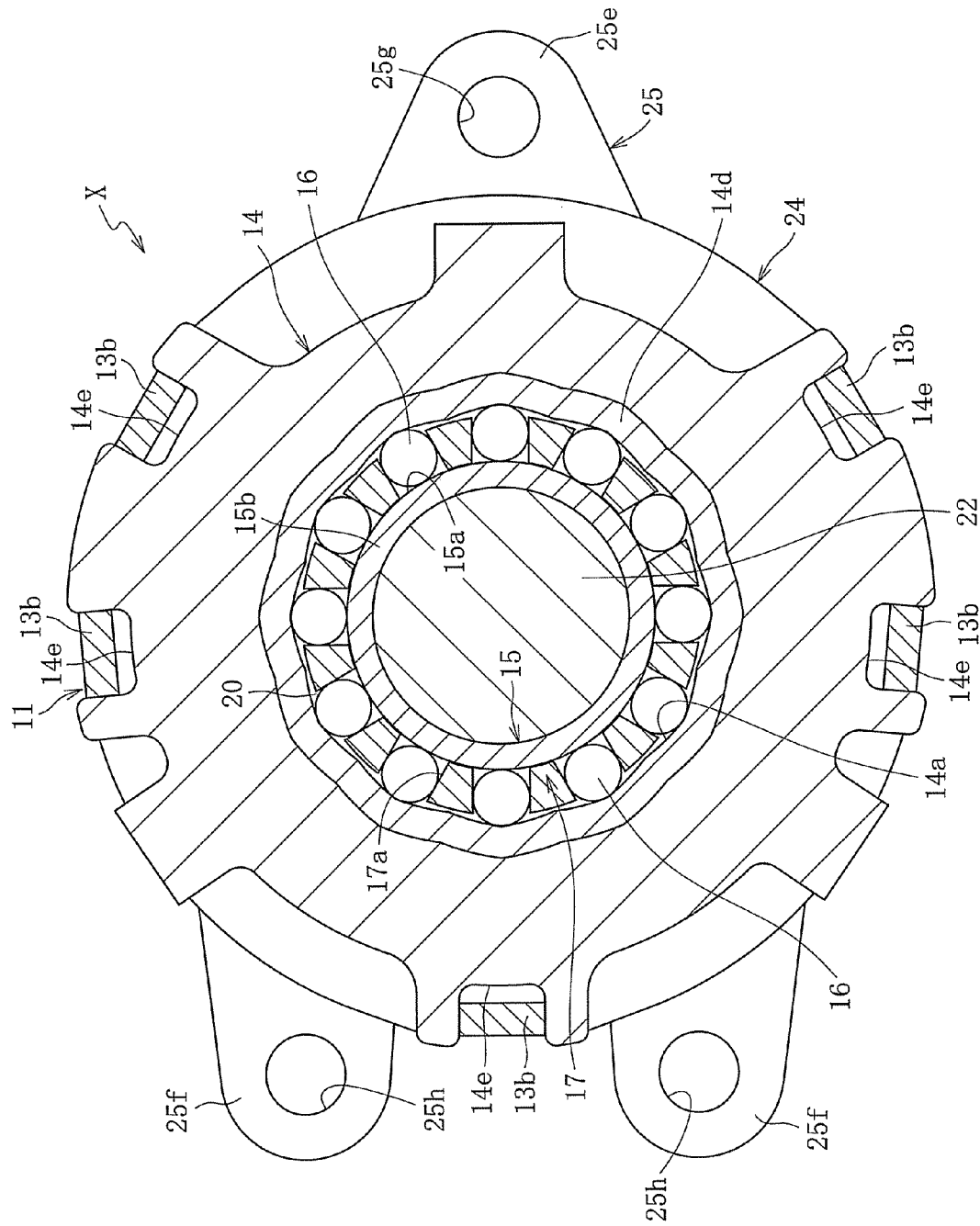
FIG. 4 is a sectional view taken along the line A-A of FIG. 1.
Figure 5:
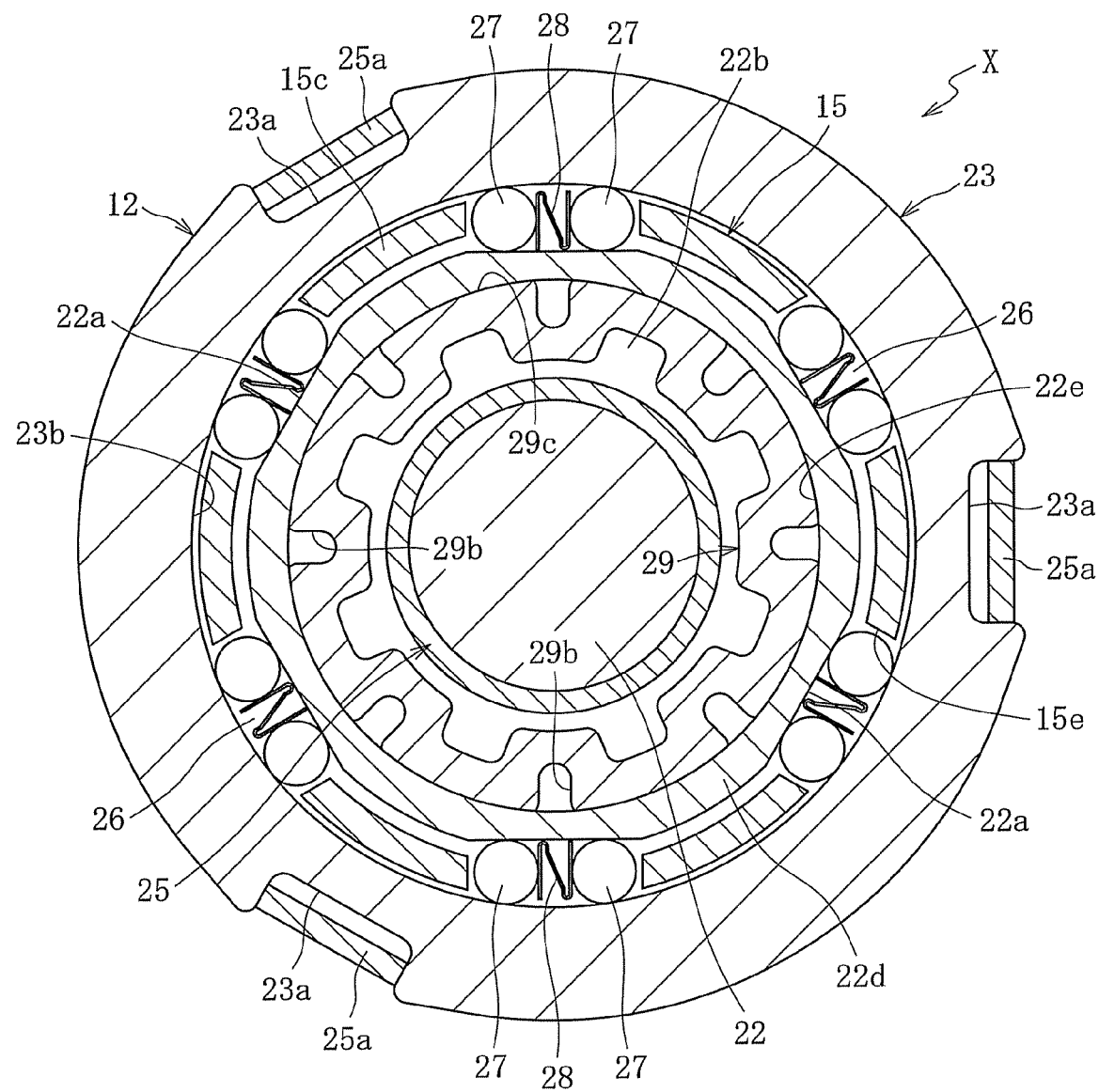
FIG. 5 is a sectional view taken along the line B-B of FIG. 1.
Figure 6A:
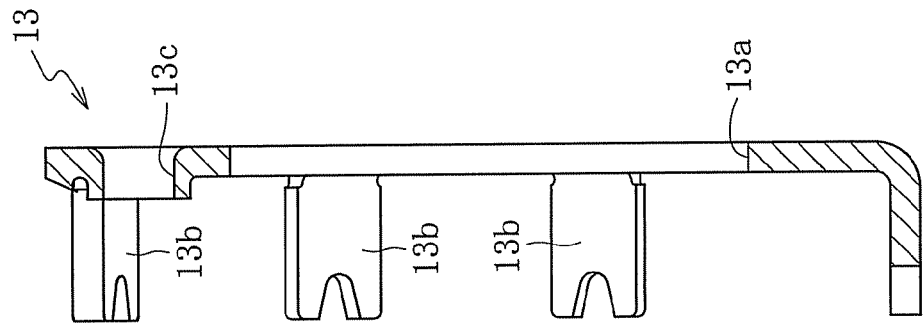
FIG. 6a is a sectional view of a lever-side side plate.
Figure 6B:
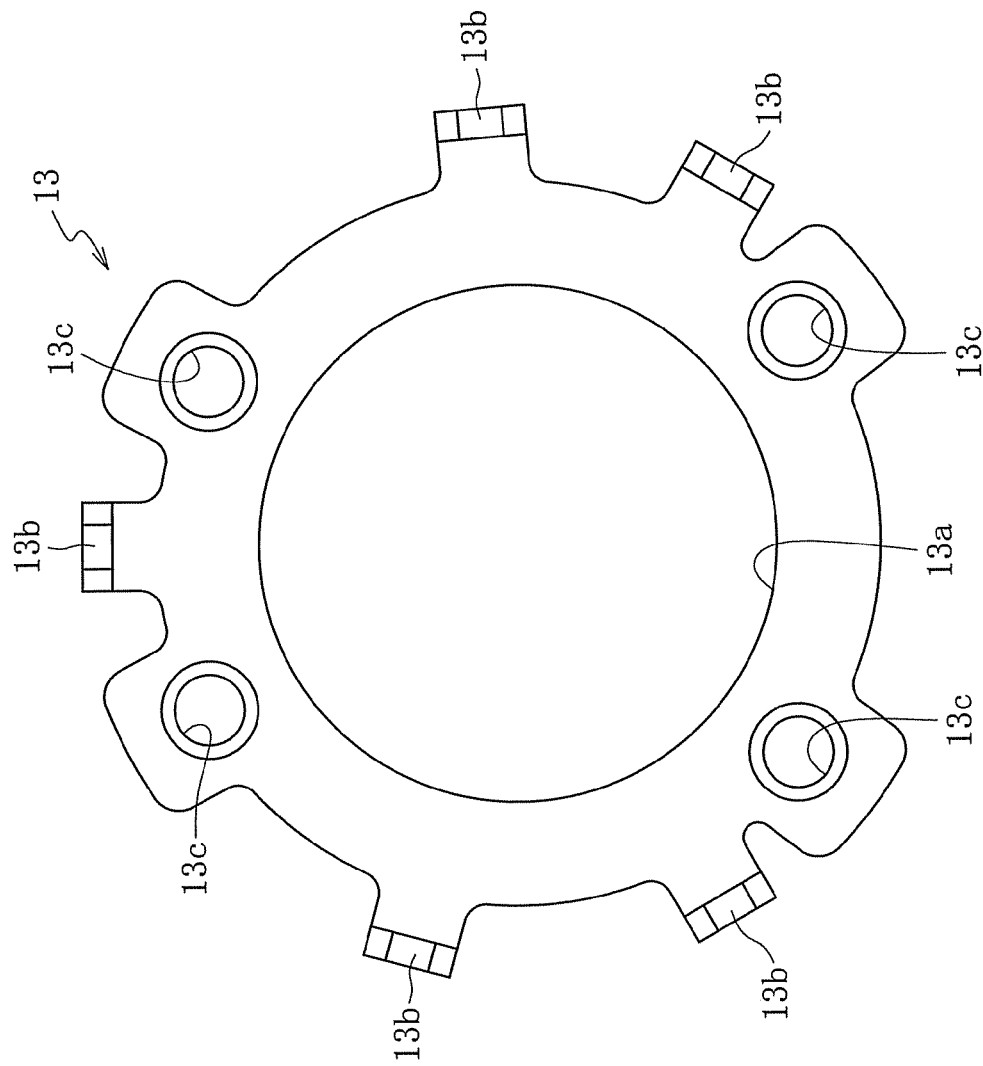
Figure 7C:
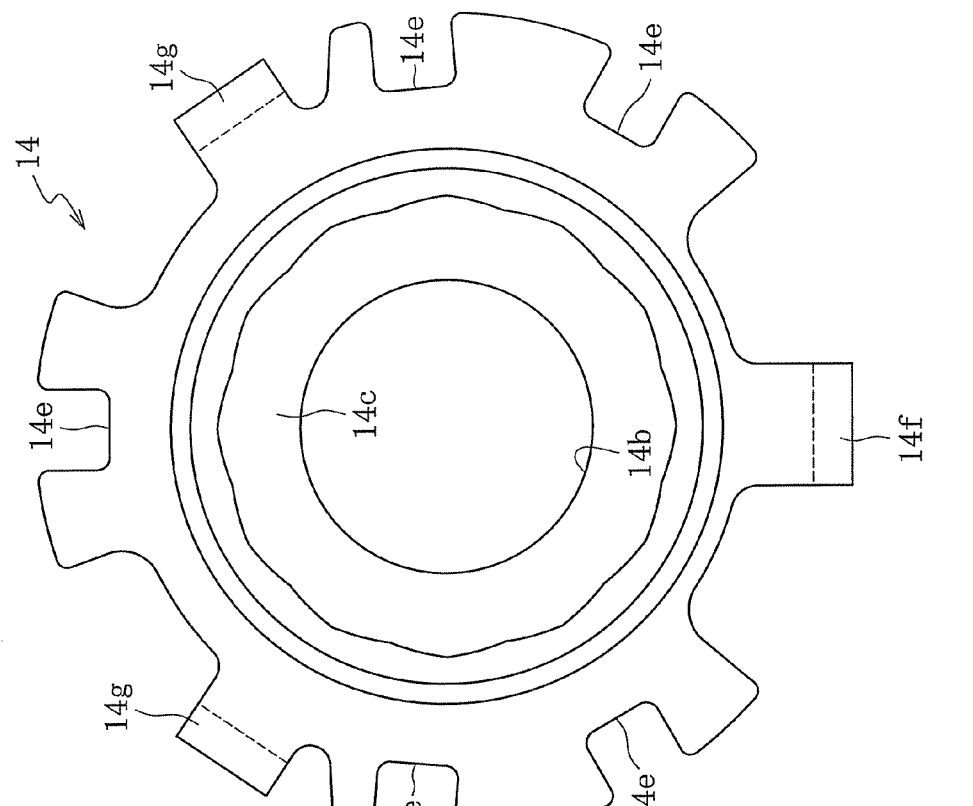
Figure 7A:
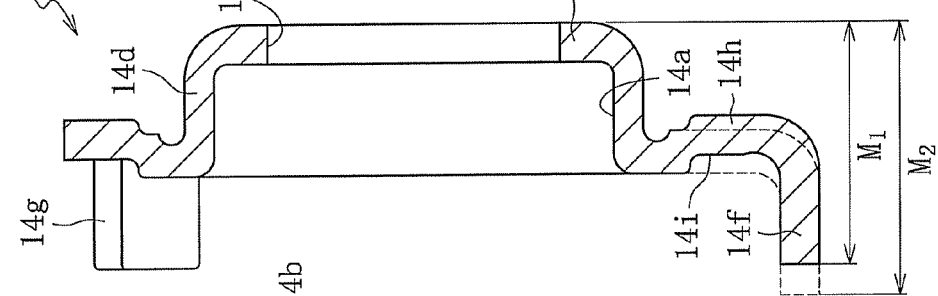
FIG. 7a is a sectional view of a lever-side outer race.
Figure 7B:
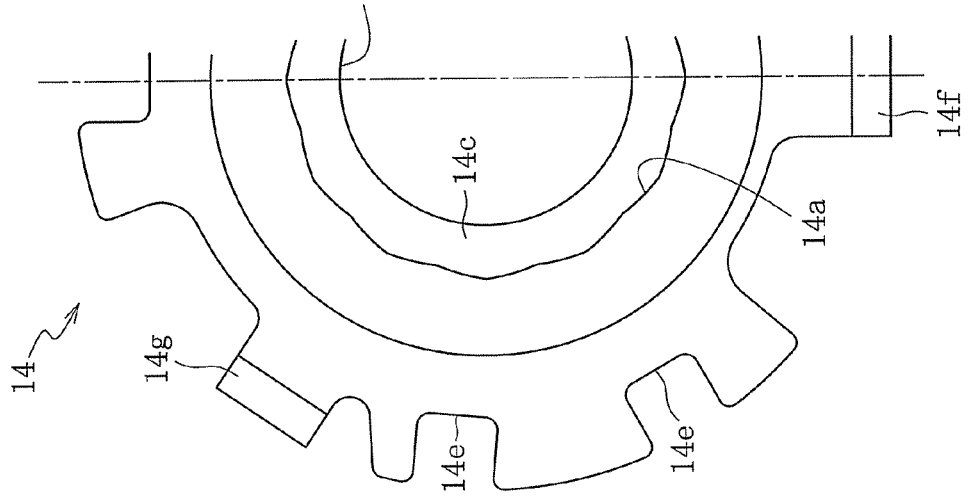
Figure 8B:
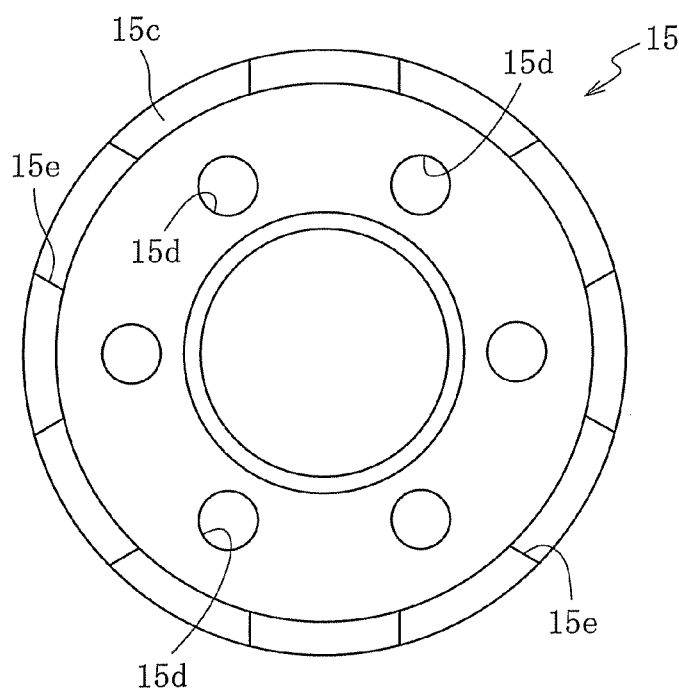
Figure 8A:
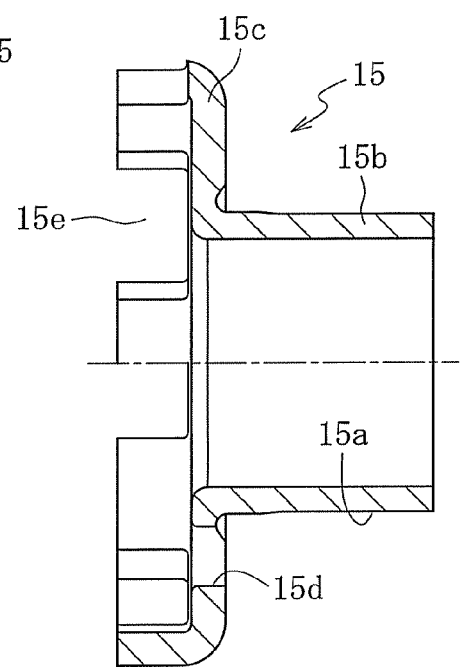
FIG. 8a is a sectional view of an inner race.
Figure 9C:
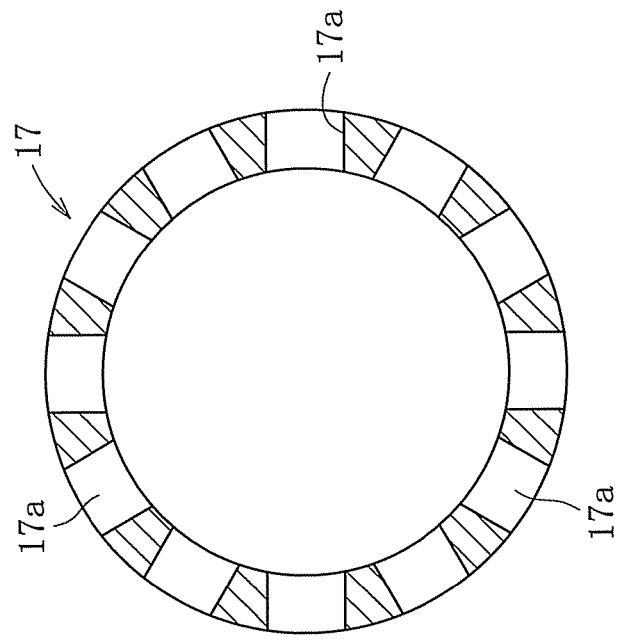
Figure 9A:
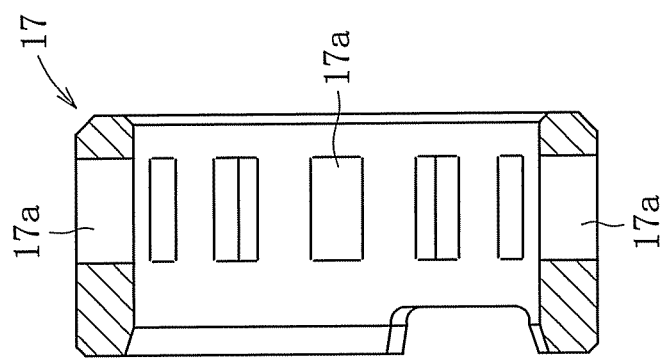
FIG. 9a is a sectional view of a retainer.
Figure 9B:
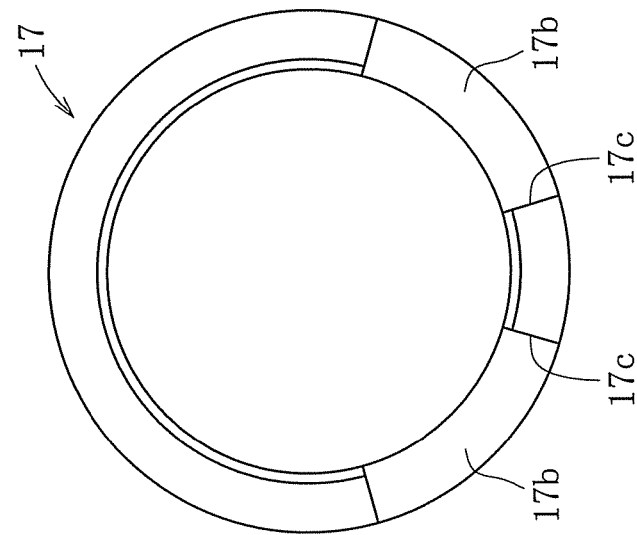
Figure 10A:
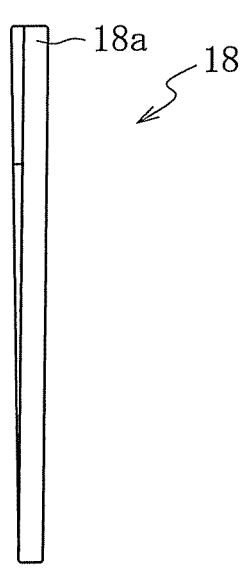
FIG. 10a is a front view of an inner centering spring.
Figure 10B:
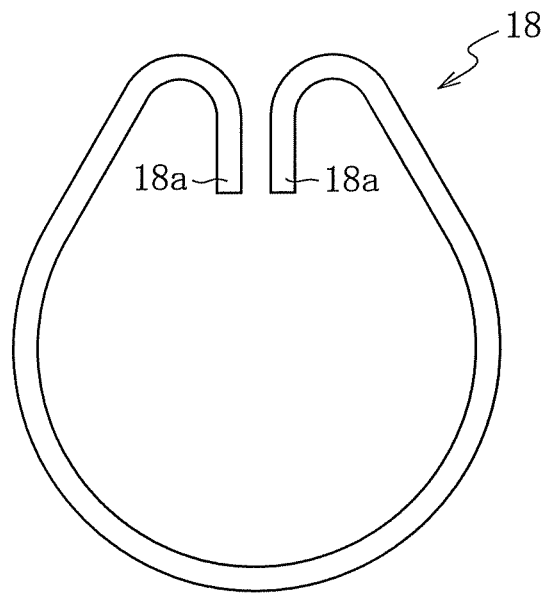
Figure 10C:
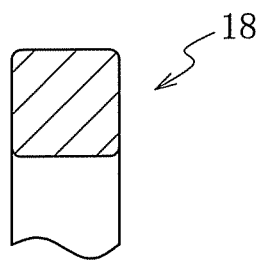
FIG. 10c is a partial sectional view of FIG. 10b.
Figure 11A:
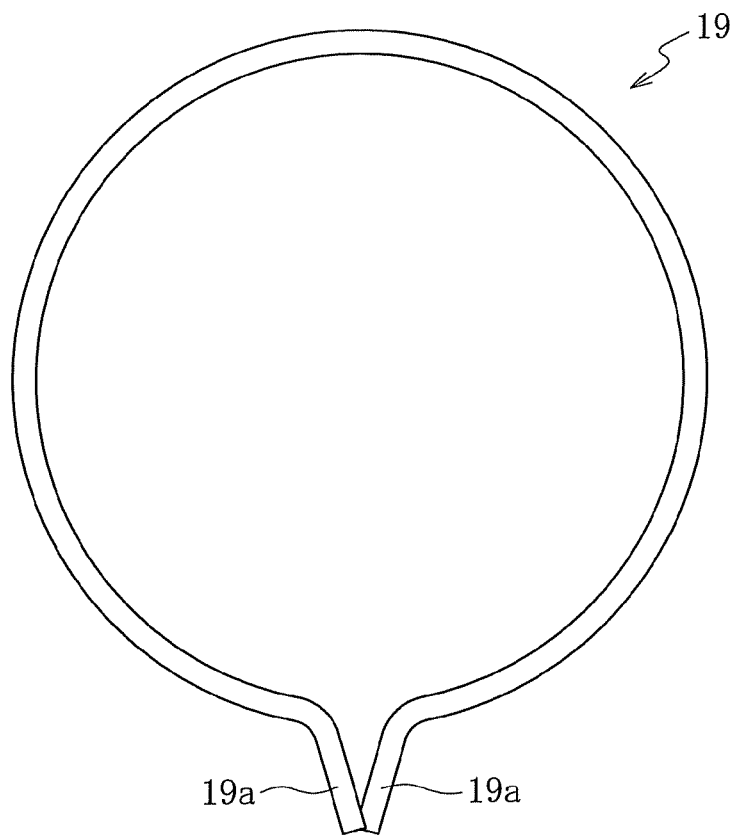
FIG. 11a is a side view of an outer centering spring.
Figure 11B:
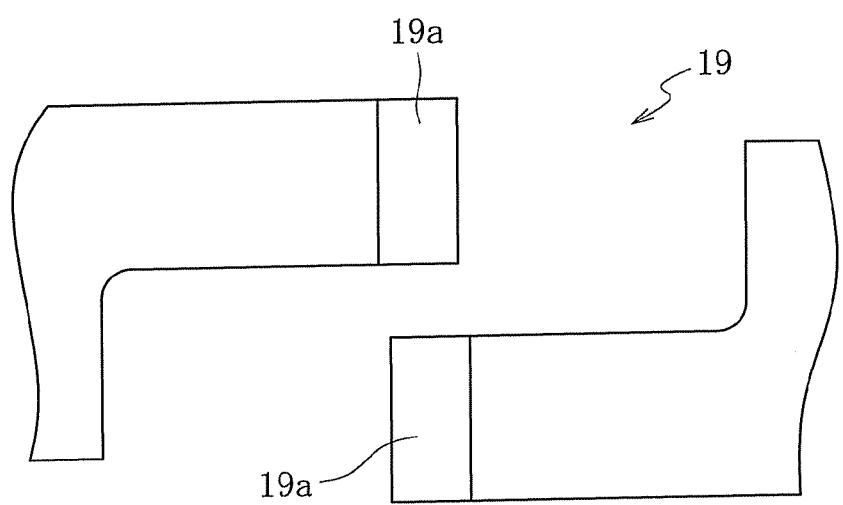
Figure 12C:
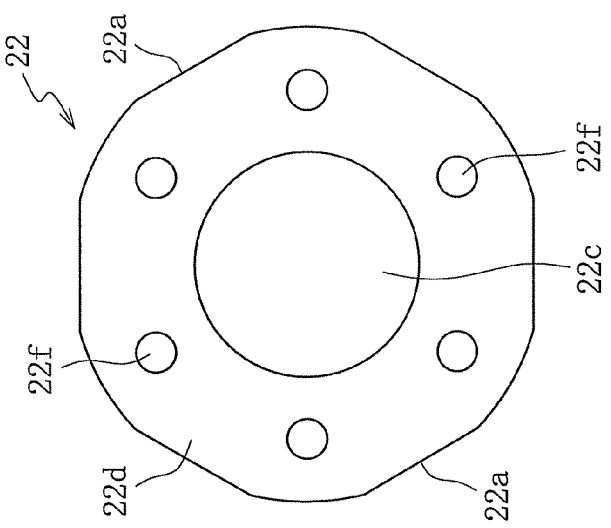
Figure 12A:
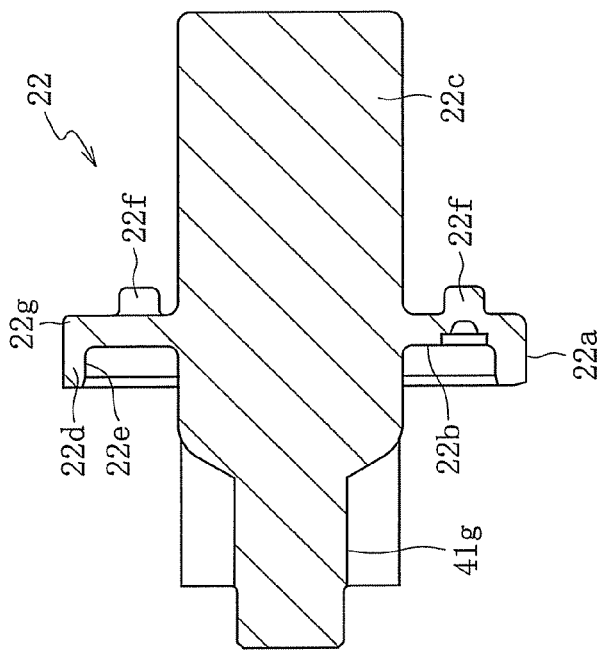
FIG. 12a is a sectional view of an output shaft.
Figure 12B:
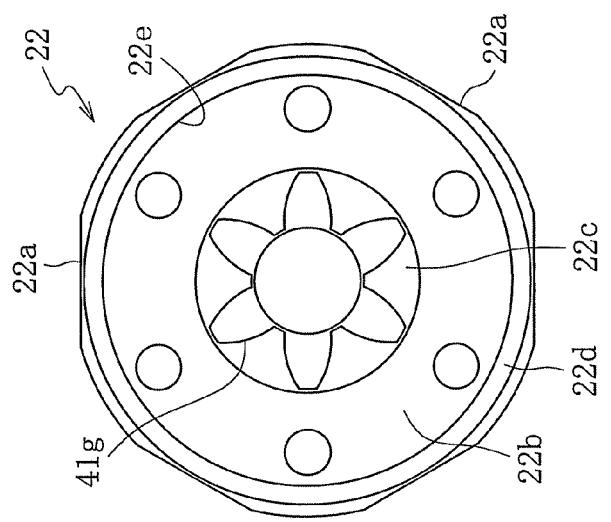
Figure 13A:
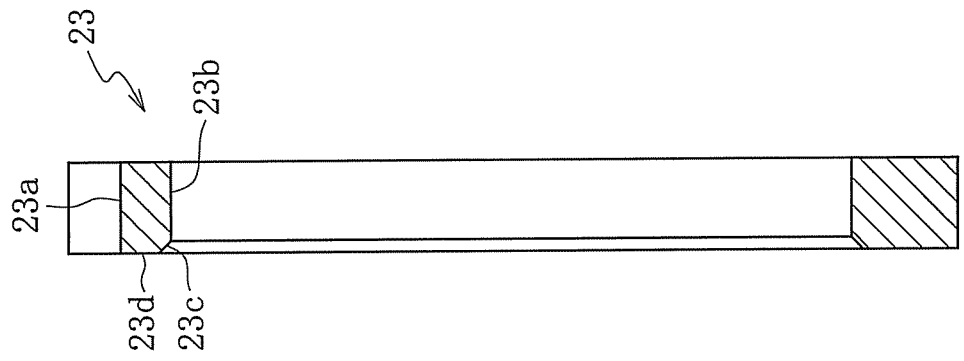
FIG. 13a is a sectional view of a brake-side outer race.
Figure 13B:
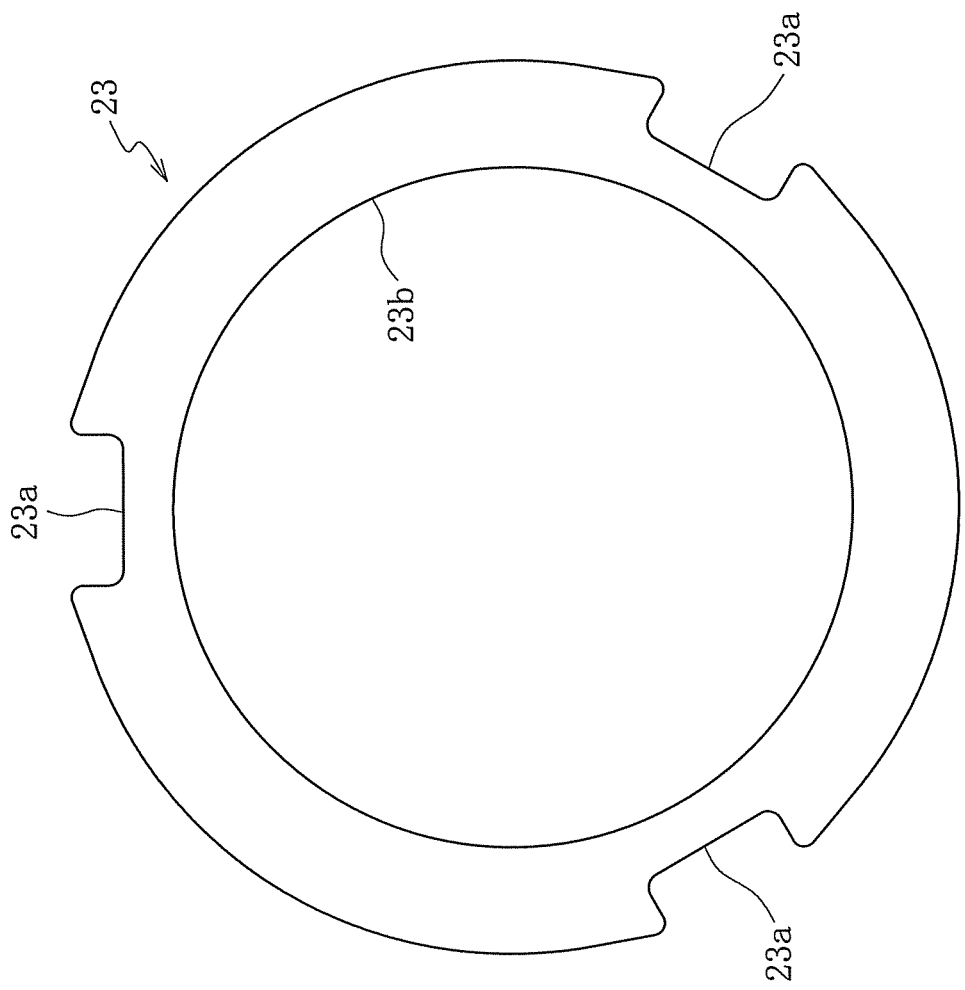
Figure 17:
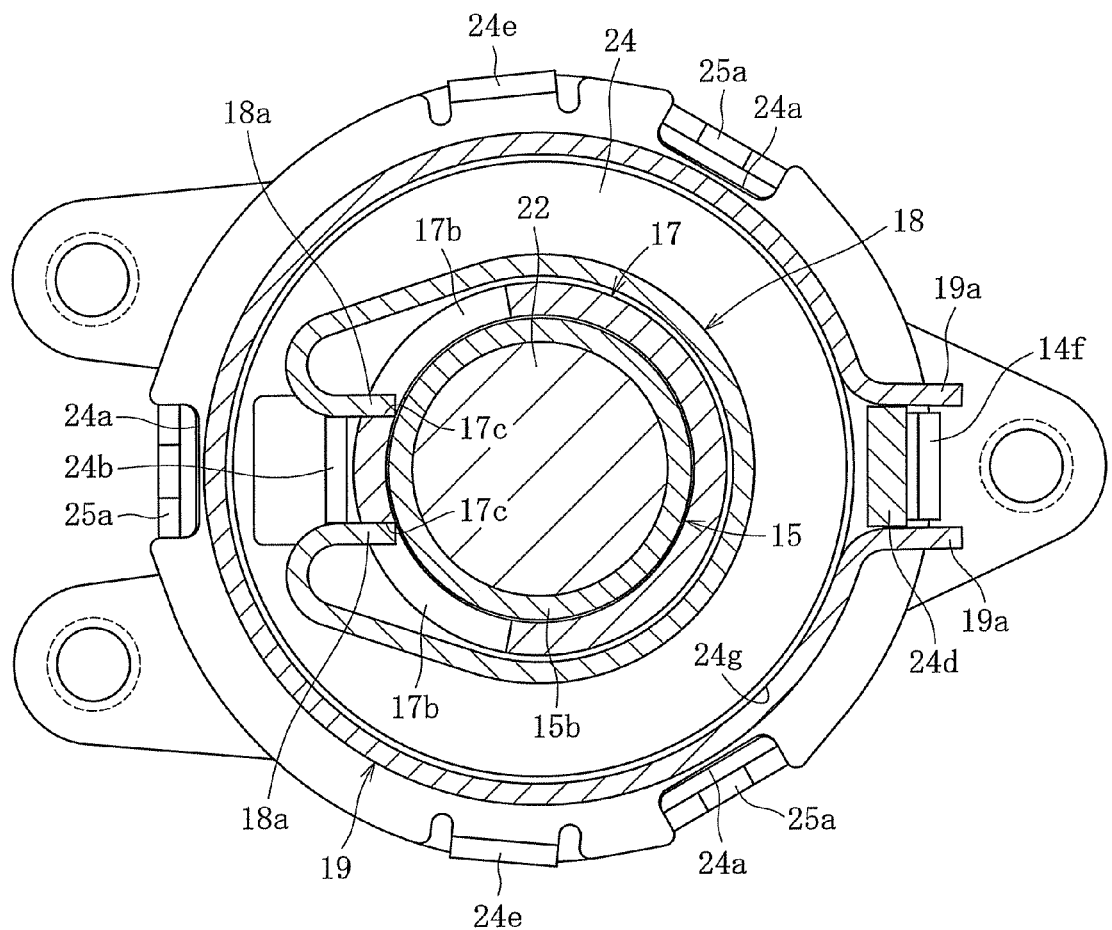
FIG. 17 is a sectional view taken along the line C-C of FIG. 1.
Figure 18A:
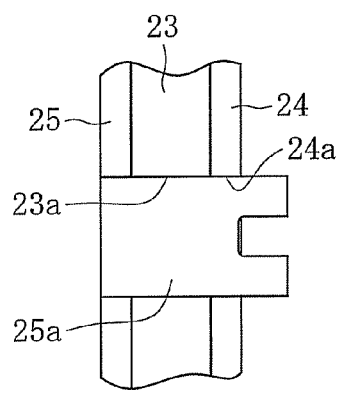
FIG. 18a is an enlarged plan view of a main part, which illustrates a state prior to swaging in a swaging structure of the brake-side outer race, the cover, and the brake-side side plate.
Figure 18B:
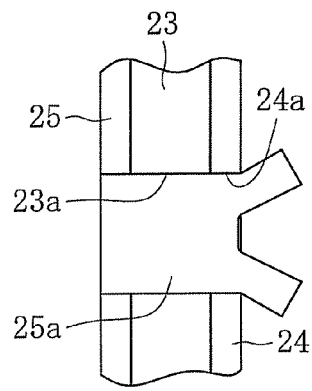
FIG. 18b is an enlarged plan view of a main part, which illustrates a state after swaging in the swaging structure of the brake-side outer race, the cover, and the brake-side side plate.
Figure 19:
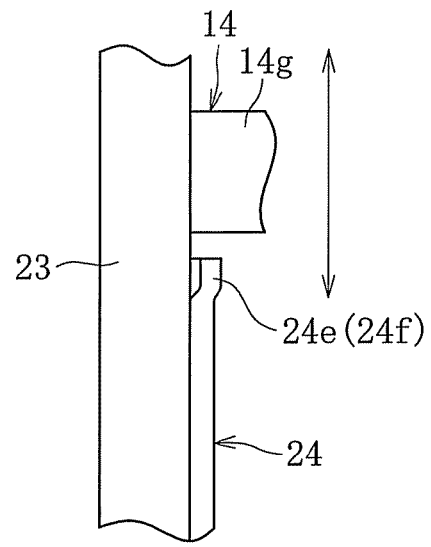
FIG. 19 is an enlarged sectional view of a main part, which illustrates a relation between the brake-side outer race, the lever-side outer race, and lock portions of the cover.
Figure 20B:
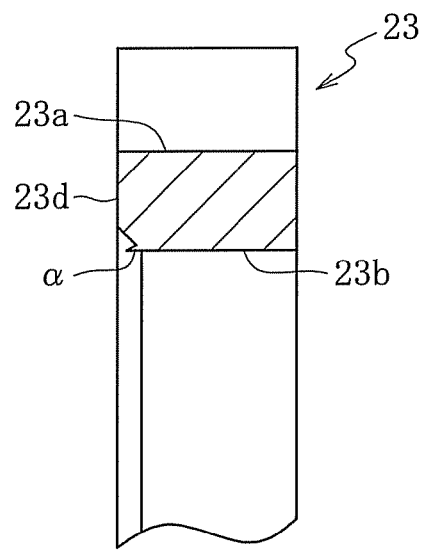
FIG. 20b is an enlarged sectional view of a main part, which illustrates a state in which a burr occurs on the chamfered portion.
Figure 20A:
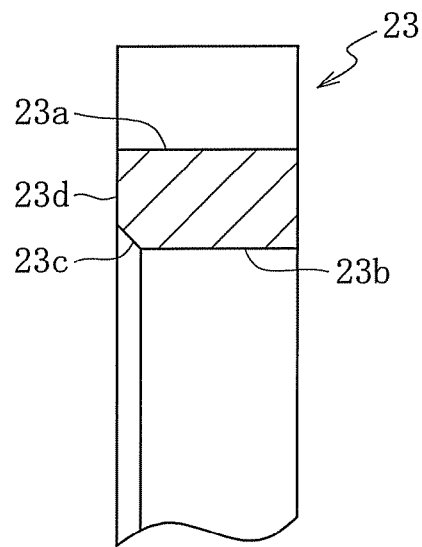
FIG. 20a is an enlarged sectional view of a main part, which illustrates a structure in which a chamfered portion is provided to the brake-side outer race.
Figure 21:
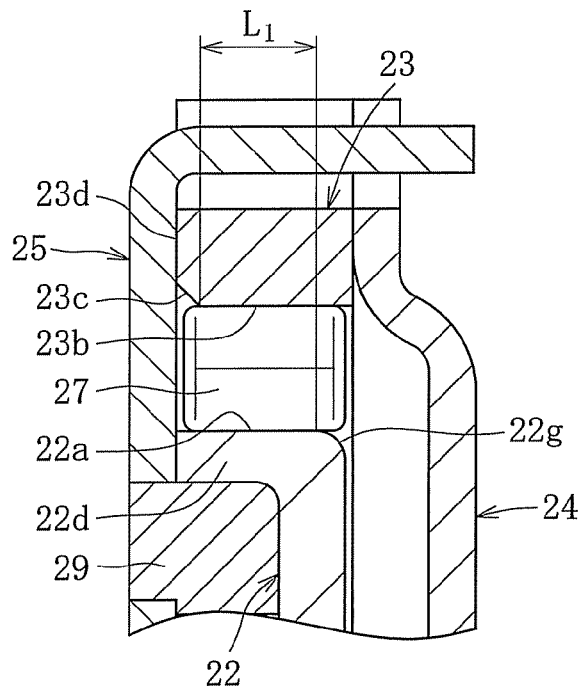
FIG. 21 is an enlarged sectional view of a main part, which illustrates a state in which the chamfered portion on the brake-side outer race is arranged on a side of the brake-side side plate.
Figure 22:
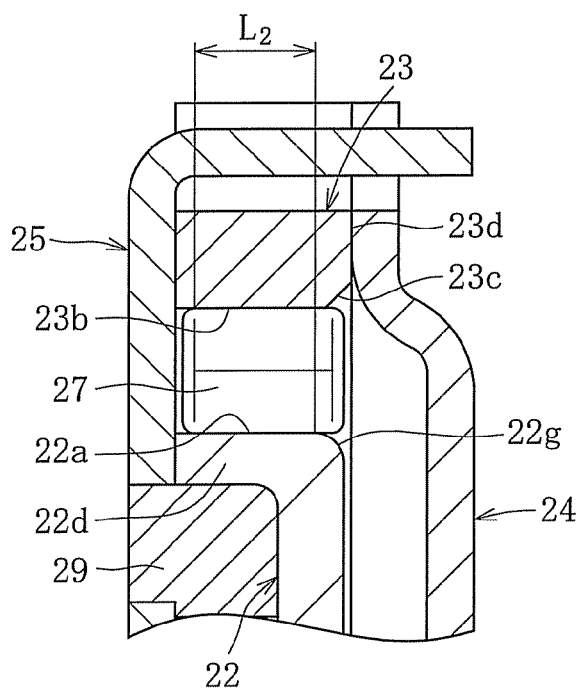
FIG. 22 is an enlarged sectional view of a main part, which illustrates a state in which the chamfered portion on the brake-side outer race is arranged on a side of the cover.
Figure 23:
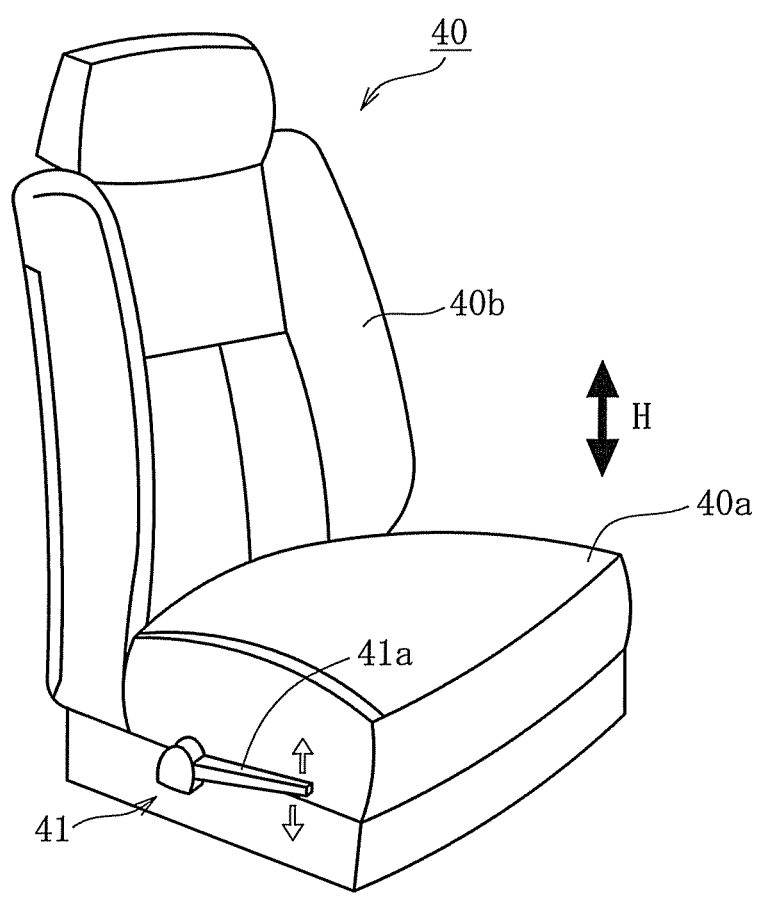
FIG. 23 is a conceptual view of a seat of an automobile.
Figure 24A:
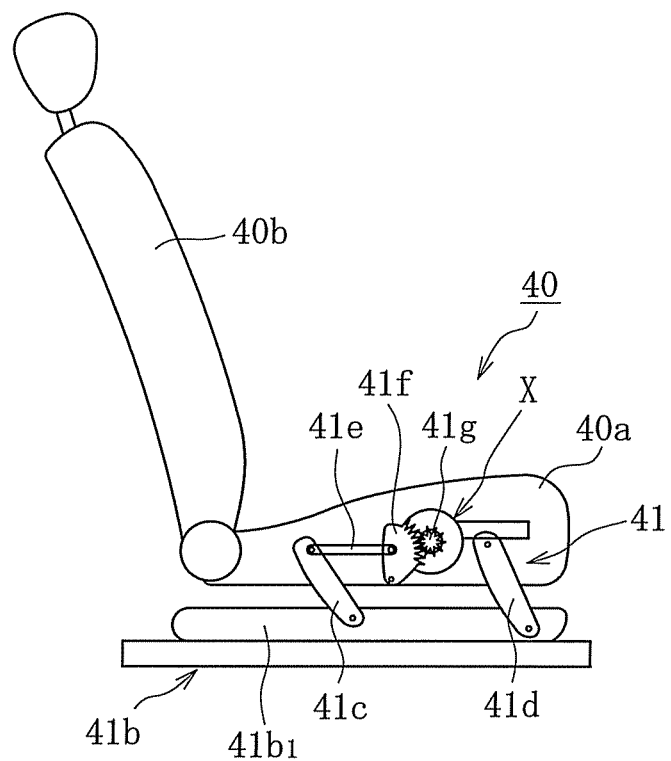
FIG. 24a is a conceptual view of a structural example of a seat lifter section.
Figure 24B:
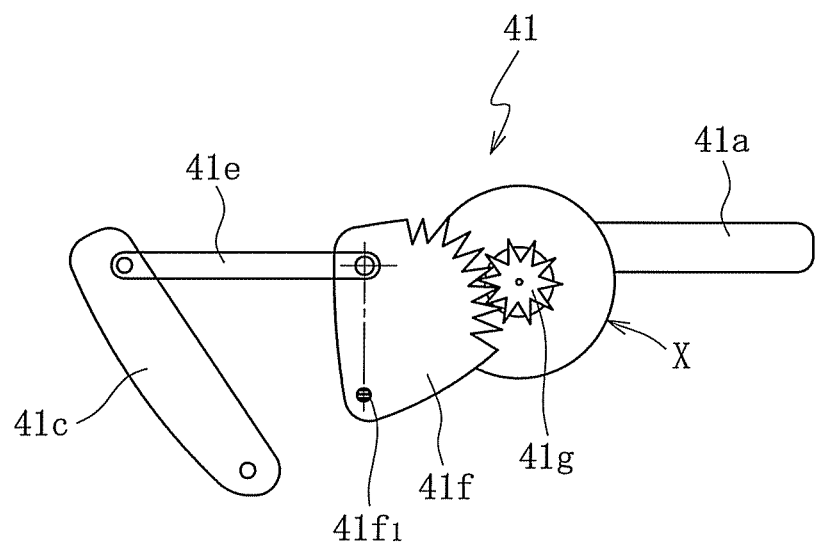
Figure 25:
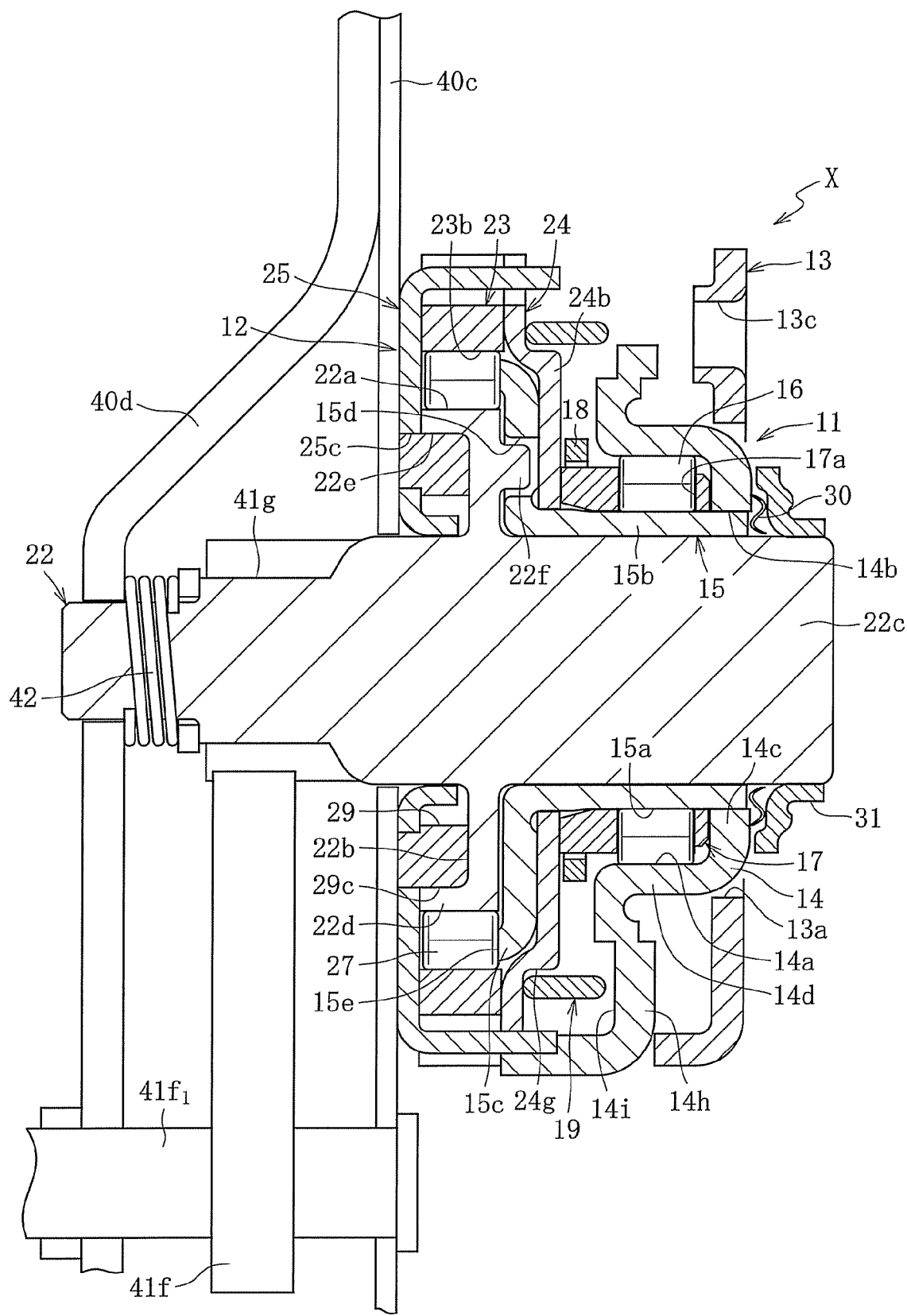
FIG. 25 is a sectional view, which illustrates a state in which the clutch unit (refer to FIG. 1) is assembled to a seat frame of the seat lifter section.
Figure 26:
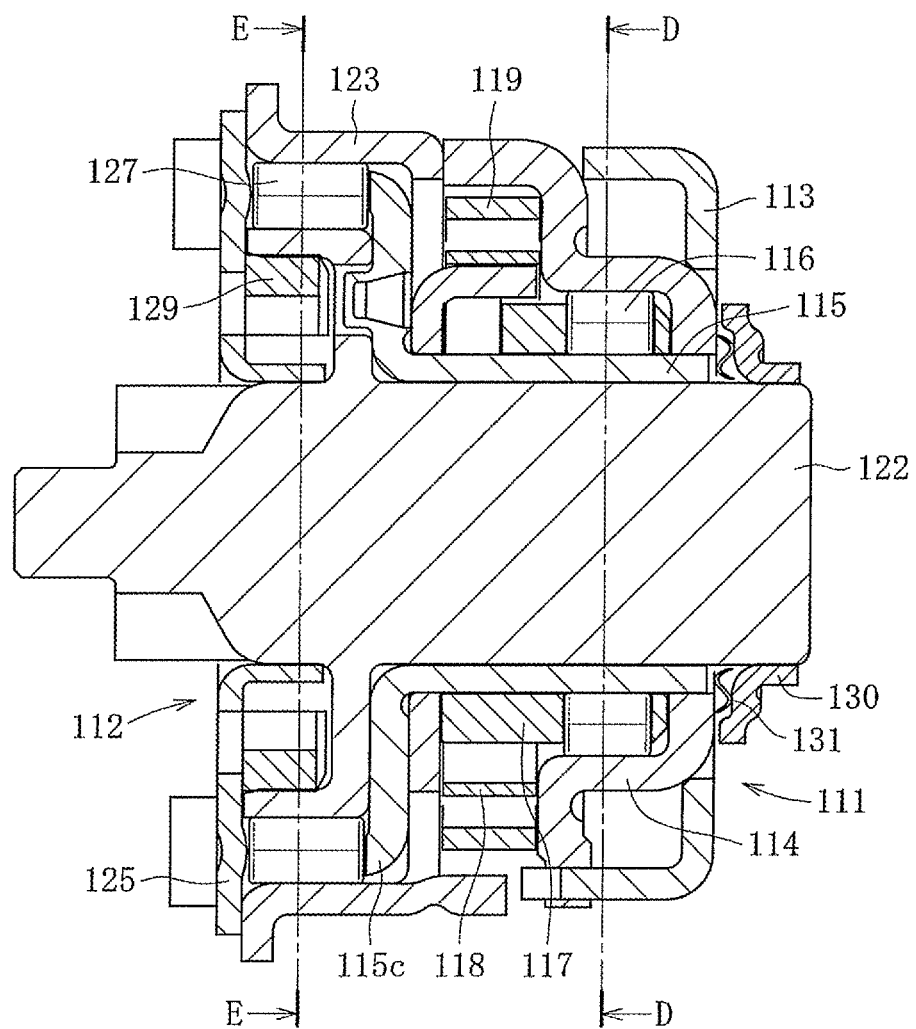
FIG. 26 is a sectional view of an overall structure of a clutch unit according to a conventional example of the present invention.
Figure 27:
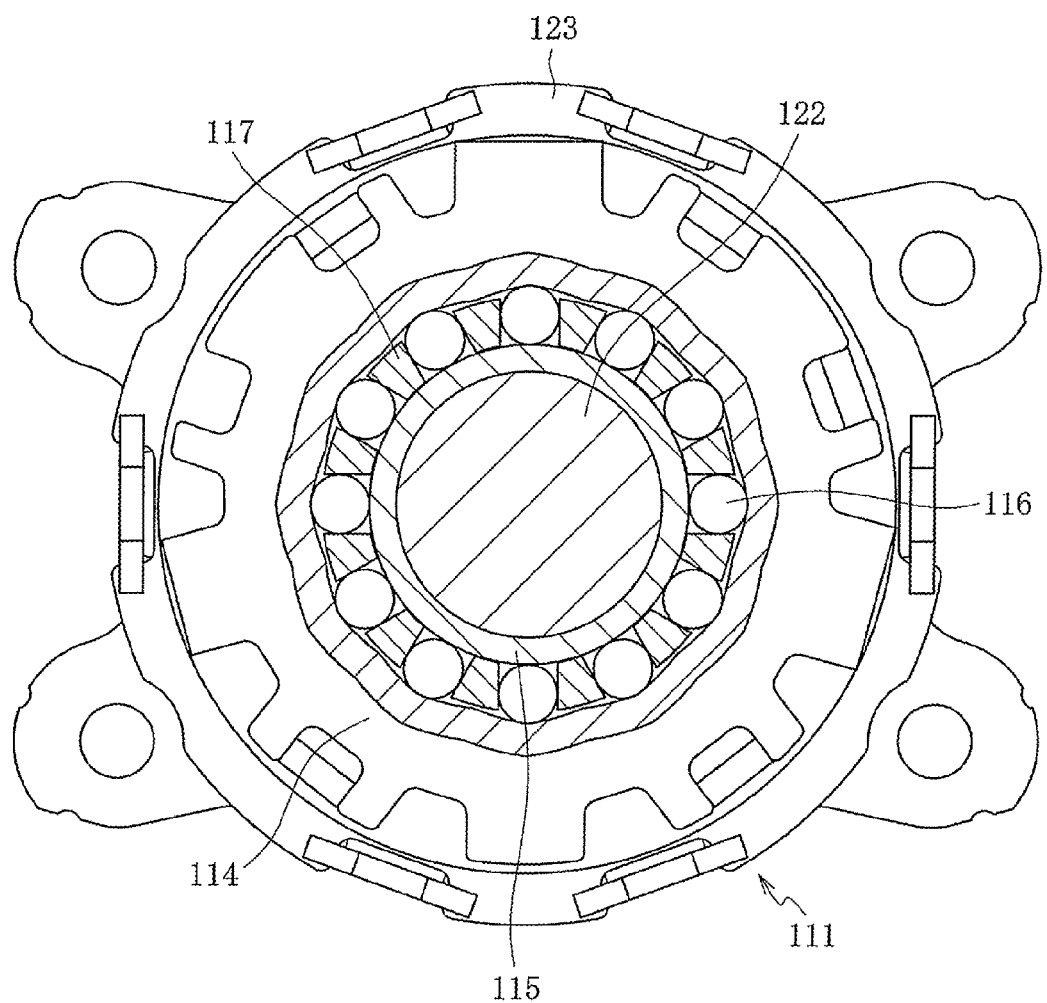
FIG. 27 is a sectional view taken along the line D-D of FIG. 26.
Figure 28:
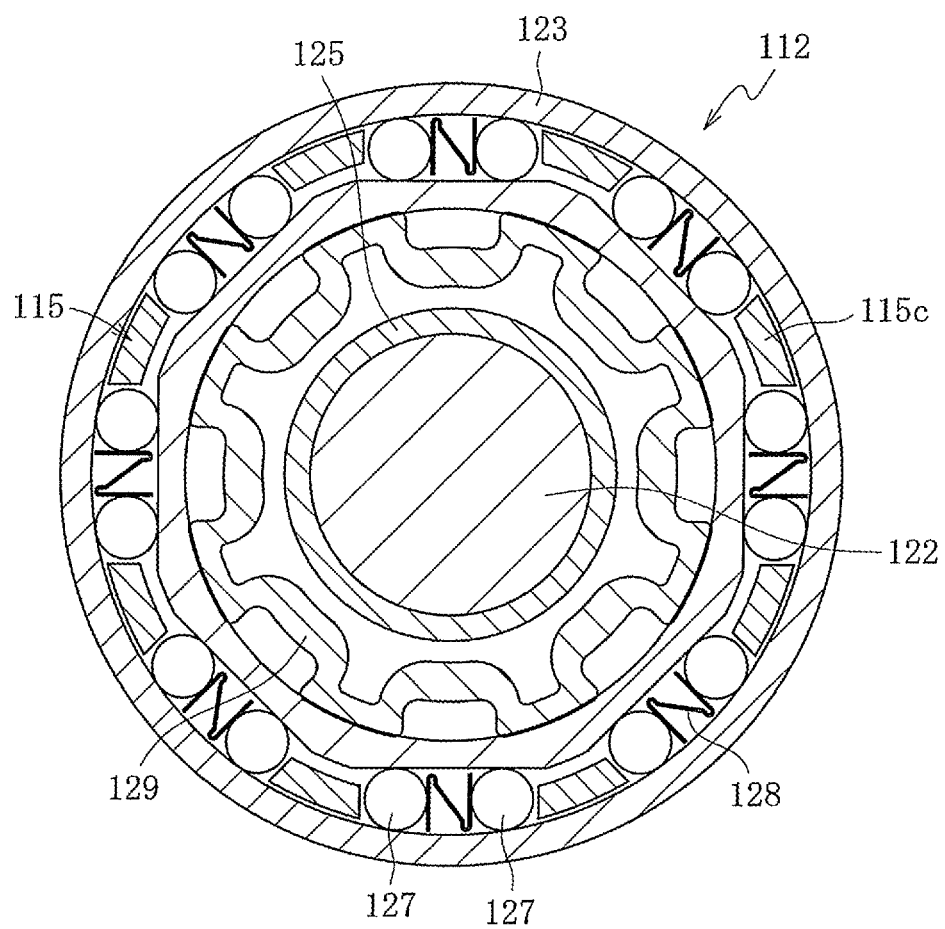
FIG. 28 is a sectional view taken along the line E-E of FIG. 26.
Figure 29:
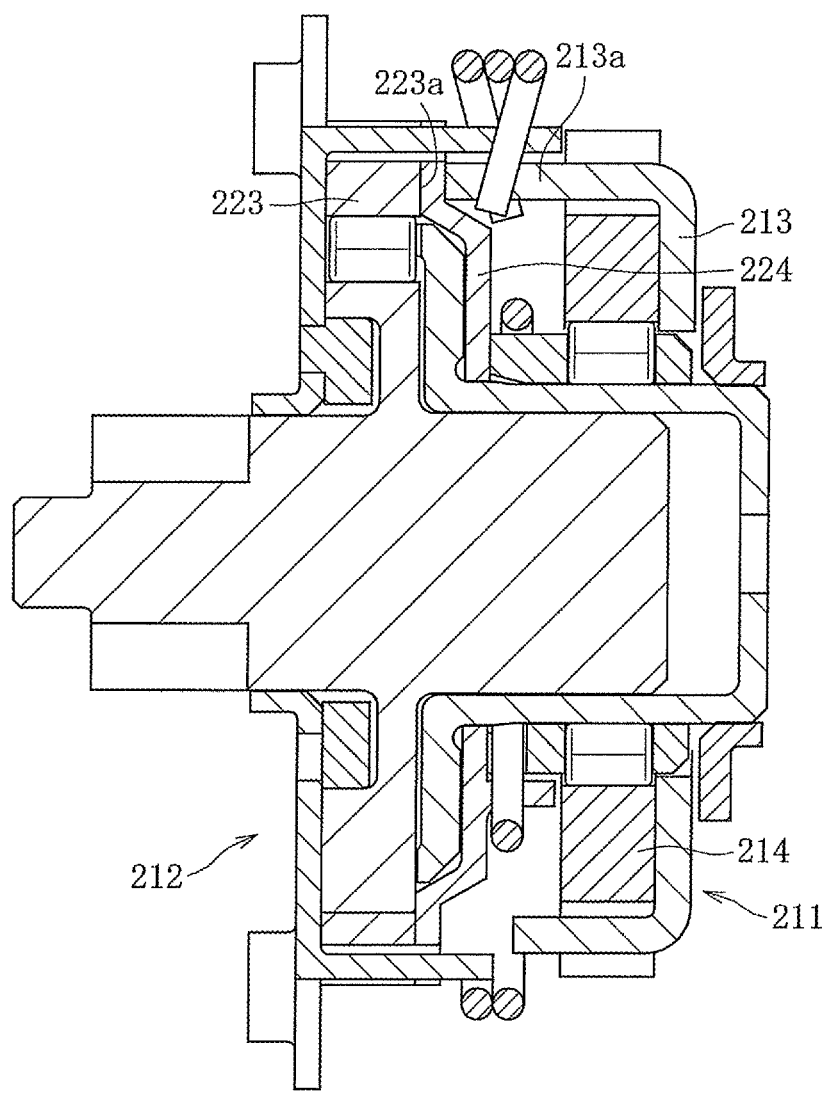
FIG. 29 is a sectional view of an overall structure of a clutch unit previously proposed by the applicants of the subject application.
Figure 30:
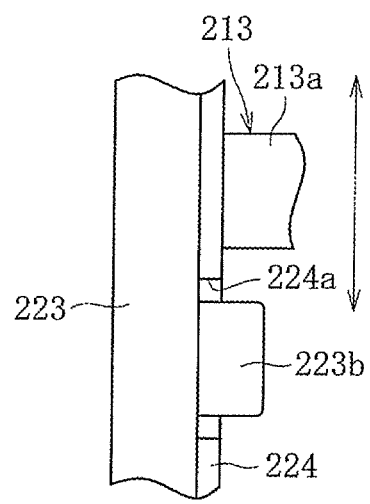
FIG. 30 is an enlarged sectional view of a main part, which illustrates a relation between a brake-side outer race, a lever-side outer race, and lock portions.

DESCRIPTION OF SYMBOLS 11 lever-side clutch portion
12 brake-side clutch portion
13 input-side member (lever-side side plate)
14 input-side member (lever-side outer race)
14g claw portion
14i depressed portion
15 coupling member (inner race)
16 engaging element (cylindrical roller)
17 retainer
18 first elastic member (inner centering spring)
19 second elastic member (outer centering spring)
22 output-side member (output shaft)

23 stationary-side member (brake-side outer race)
24 stationary-side member (cover)
24e, 24f lock portion
25 stationary-side member (brake-side side plate)
27 engaging element (cylindrical roller)

The invention claimed is:

1. A clutch unit, comprising:
a lever-side clutch portion provided on an input side, for controlling transmission/interruption of rotational torque to an output side with lever operation;
a brake-side clutch portion provided on an output side, for transmitting torque input from the lever-side clutch portion to the output side and for interrupting torque reverse-input from the output side, wherein:
the lever-side clutch portion comprises an input-side member to which torque is input with the lever operation;
claw portions extending in an axial direction are provided on an outer periphery of a lever-side outer race of the input-side member;
the brake-side clutch portion comprises a stationary-side member restricted in rotation, the stationary-side member including a brake-side outer race arranged while being separated from the lever-side outer race in the axial direction and a cover attached to the brake-side outer race on a lever-side outer race side thereof;
the claw portions of the lever-side outer race are brought into slidable contact with an end surface of the brake-side outer race with rotation of the lever-side outer race, the rotation being effected with the lever operation; and
the claw portions of the lever-side outer race are allowed to come into contact, in a rotational direction, with lock portions provided on an outer periphery of the cover.

2. A clutch unit according to claim 1, wherein the lock portions provided to the cover of the brake-side clutch portion are formed by stepping.

3. A clutch unit according to claim 2, wherein the lever-side clutch portion further comprises:
a coupling member transmitting the torque input from the input-side member to the brake-side clutch portion;
a plurality of engagement elements for controlling transmission/interruption of the torque input from the input-side member through engagement/disengagement between the input-side member and the coupling member;
a retainer for retaining the engagement elements at predetermined intervals in a circumferential direction;
a stationary-side member restricted in rotation;
a first elastic member provided between the retainer and the stationary-side member, for accumulating elastic force obtained by the torque input from the input-side member and restoring the retainer to a neutral state by releasing the elastic force obtained by the torque input therefrom and thus accumulated; and
a second elastic member provided between the input-side member and the stationary-side member, for accumulating the elastic force with the torque input from the input-side member and restoring the input-side member to a neutral state by releasing the elastic force obtained by the torque input therefrom and thus accumulated.

4. A clutch unit according to claim 2, wherein the brake-side clutch portion further comprises:
a coupling member to which torque input from the lever-side clutch portion is input;
an output-side member from which the torque is output; and
a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member.

5. A clutch unit according to claim 2, wherein at least one of engaging elements of the lever-side clutch portion and engaging elements of the brake-side clutch portion comprise cylindrical rollers.

6. A clutch unit according to claim 1, further comprising:
elastic members which are arranged between the input-side member of the lever-side clutch portion and the stationary-side member of the brake-side clutch portion so as to accumulate elastic force obtained by the torque input from the input-side member and to restore the input-side member to a neutral state by releasing the elastic force obtained by the torque input therefrom and thus accumulated; and
a depressed portion formed by local bending and molding of a part corresponding to the elastic members of the input-side member, for partially accommodating the elastic members.

7. A clutch unit according to claim 6, wherein the elastic members comprise plate-like spring members.

8. A clutch unit according to claim 7, wherein the lever-side clutch portion further comprises:
a coupling member transmitting the torque input from the input-side member to the brake-side clutch portion;
a plurality of engagement elements for controlling transmission/interruption of the torque input from the input-side member through engagement/disengagement between the input-side member and the coupling member;
a retainer for retaining the engagement elements at predetermined intervals in a circumferential direction;
a stationary-side member restricted in rotation;
a first elastic member provided between the retainer and the stationary-side member, for accumulating elastic force obtained by the torque input from the input-side member and restoring the retainer to a neutral state by releasing the elastic force obtained by the torque input therefrom and thus accumulated; and
a second elastic member provided between the input-side member and the stationary-side member, for accumulating the elastic force with the torque input from the input-side member and restoring the input-side member to the neutral state by releasing the elastic force obtained by the torque input therefrom and thus accumulated.

9. A clutch unit according to claim 7, wherein the brake-side clutch portion further comprises:
a coupling member to which torque input from the lever-side clutch portion is input;
an output-side member from which the torque is output; and
a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member.

10. A clutch unit according to claim 7, wherein at least one of engaging elements of the lever-side clutch portion and engaging elements of the brake-side clutch portion comprise cylindrical rollers.

11. A clutch unit according to claim 6, wherein the lever-side clutch portion further comprises:

a coupling member transmitting the torque input from the input-side member to the brake-side clutch portion;

a plurality of engagement elements for controlling transmission/interruption of the torque input from the input-side member through engagement/disengagement between the input-side member and the coupling member;

a retainer for retaining the engagement elements at predetermined intervals in a circumferential direction;

a stationary-side member restricted in rotation;

a first elastic member provided between the retainer and the stationary-side member, for accumulating elastic force obtained by the torque input from the input-side member and restoring the retainer to a neutral state by releasing the elastic force obtained by the torque input therefrom and thus accumulated; and a second elastic member provided between the input-side member and the stationary-side member, for accumulating the elastic force with the torque input from the input-side member and restoring the input-side member to the neutral state by releasing the elastic force obtained by the torque input therefrom and thus accumulated.

12. A clutch unit according to claim 6, wherein the brake-side clutch portion further comprises:

a coupling member to which torque input from the lever-side clutch portion is input;

an output-side member from which the torque is output; and a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member.

13. A clutch unit according to claim 6, wherein at least one of engaging elements of the lever-side clutch portion and engaging elements of the brake-side clutch portion comprise cylindrical rollers.

14. A clutch unit according to claim 1, wherein the lever-side clutch portion further comprises:

a coupling member transmitting the torque input from the input-side member to the brake-side clutch portion;

a plurality of engagement elements for controlling transmission/interruption of the torque input from the input-side member through engagement/disengagement between the input-side member and the coupling member;

a retainer for retaining the engagement elements at predetermined intervals in a circumferential direction;

a stationary-side member restricted in rotation;

a first elastic member provided between the retainer and the stationary-side member, for accumulating elastic force obtained by the torque input from the input-side member and restoring the retainer to a neutral state by releasing the elastic force obtained by the torque input therefrom and thus accumulated; and a second elastic member provided between the input-side member and the stationary-side member, for accumulating the elastic force with the torque input from the input-side member and restoring the input-side member to a neutral state by releasing the elastic force obtained by the torque input therefrom and thus accumulated.

15. A clutch unit according to claim 14, wherein at least one of the engaging elements of the lever-side clutch portion and engaging elements of the brake-side clutch portion comprise cylindrical rollers.

16. A clutch unit according to claim 1, wherein the brake-side clutch portion further comprises:

a coupling member to which torque input from the lever-side clutch portion is input;

an output-side member from which the torque is output; and a plurality of pairs of engagement elements arranged in wedge gaps between the stationary-side member and the output-side member, for controlling transmission of the torque input from the coupling member and interrupting the torque reverse-input from the output-side member through engagement/disengagement between the stationary-side member and the output-side member.

17. A clutch unit according to claim 16, wherein at least one of engaging elements of the lever-side clutch portion and the engaging elements of the brake-side clutch portion comprise cylindrical rollers.

18. A clutch unit according to claim 1, wherein at least one of engaging elements of the lever-side clutch portion and engaging elements of the brake-side clutch portion comprise cylindrical rollers.

19. A clutch unit according to claim 1, wherein:

the lever-side clutch portion and the brake-side clutch portion are incorporated in an automobile seat-lifter section.

20. A clutch unit according to claim 19, wherein:

the input-side member of the lever-side clutch portion is connected to an operation lever; and an output-side member of the brake-side clutch portion is coupled to a rotary member of the automobile seat-lifter section.

* * * * *